US011132806B2

(12) United States Patent
Ishikawa et al.

(10) Patent No.: US 11,132,806 B2
(45) Date of Patent: Sep. 28, 2021

(54) IMAGE PROCESSING APPARATUS AND IMAGE PROCESSING METHOD

(71) Applicant: FUJITSU LIMITED, Kawasaki (JP)

(72) Inventors: Yu Ishikawa, Yokohama (JP); Atsunori Moteki, Inagi (JP); Toshiyuki Yoshitake, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 61 days.

(21) Appl. No.: 16/805,964

(22) Filed: Mar. 2, 2020

(65) Prior Publication Data
US 2020/0294258 A1 Sep. 17, 2020

(30) Foreign Application Priority Data

Mar. 13, 2019 (JP) .............................. JP2019-046356

(51) Int. Cl.
*G06K 9/00* (2006.01)
*G06T 7/543* (2017.01)
(Continued)

(52) U.S. Cl.
CPC ............ *G06T 7/543* (2017.01); *G06K 9/4604* (2013.01); *G06T 7/0002* (2013.01); *G06T 7/13* (2017.01)

(58) Field of Classification Search
CPC ......... G06T 7/543; G06T 7/13; G06T 7/0002; G06K 9/4604
(Continued)

(56) References Cited

U.S. PATENT DOCUMENTS 9,934,599 B2 * 4/2018 Hsieh .................. G06T 5/30
10,311,576 B2 * 6/2019 Yamaguchi ............ G06T 7/13
(Continued)

FOREIGN PATENT DOCUMENTS

JP 2007-328758 A 12/2007
JP 2012-032344 A 2/2012
(Continued)

OTHER PUBLICATIONS

Gee, Andrew P., and Walterio Mayol-Cuevas. "Real-time model-based SLAM using line segments." International Symposium on Visual Computing. Springer, Berlin, Heidelberg, 2006. (Year: 2006).*
(Continued)

*Primary Examiner* — Jonathan S Lee
(74) *Attorney, Agent, or Firm* — Fujitsu Patent Center

(57) ABSTRACT

An image processing apparatus includes: a memory that stores shape information including a plurality of line segments representing a shape of an object; and a processor. The processor is configured to: detect a plurality of feature lines from an image of the object, generate a target projection line by projecting any of the plurality of line segments over the image of the object, extract a feature line overlapping with a predetermined region based on the target projection line over the image of the object from the plurality of feature lines to generate a set of feature lines, and select a target feature line from the set of feature lines based on gradient information indicating a gradient of pixel values over the image of the object, and calculate a deviation amount between a line segment corresponding to the target projection line and the target feature line.

20 Claims, 24 Drawing Sheets

(51) Int. Cl.
    *G06T 7/13* (2017.01)
    *G06K 9/46* (2006.01)
    *G06T 7/00* (2017.01)

(58) Field of Classification Search
    USPC .......................................................... 382/154
    See application file for complete search history.

(56) References Cited

U.S. PATENT DOCUMENTS

| | | | | |
|---|---|---|---|---|
| 10,997,702 | B2* | 5/2021 | Moteki | ................ G06T 7/0002 |
| 2012/0027289 | A1 | 2/2012 | Naruse et al. | |
| 2016/0012638 | A1 | 1/2016 | Skrobanski | |
| 2017/0287154 | A1 | 10/2017 | Yamaguchi | |
| 2018/0089836 | A1 | 3/2018 | Yamaguchi et al. | |

FOREIGN PATENT DOCUMENTS

| | | |
|---|---|---|
| JP | 2012-141899 A | 7/2012 |
| JP | 2016-514310 A | 5/2016 |
| JP | 2017-182302 A | 10/2017 |
| JP | 2018-055199 A | 4/2018 |

OTHER PUBLICATIONS

Nelson, Randal C. "Finding line segments by stick growing." IEEE Transactions on Pattern Analysis and Machine Intelligence 16.5 (1994): 519-523. (Year: 1994).*

John Canny, "A Computational Approach to Edge Detection", IEEE Transactions on Pattern Analysis and Machine Intelligence, vol. Pami-8, No. 6, Nov. 1986, pp. 679-698 (Total 20 pages).

Atsunori Moteki et al.,"Manufacturing Defects Visualization via Robust Edge-based Registration", 2018 IEEE International Symposium on Mixed and Augmented Reality Adjunct (ISMAR-Adjunct), pp. 172-173 (Total 2 pages).

Zhengyou Zhang, "A Flexible New Technique for Camera Calibration", IEEE Transactions on Pattern Analysis and Machine Intelligence, vol. 22, No. 11, Nov. 2000, pp. 1330-1334(Total 5 pages).

Rafael Grompone von Gioi et al.,"LSD: A Line Segment Detector", Image Processing on Line, 2 (2012), Mar. 2012 (Total 10 pages).

Lawrence Gilman Roberts, "Machine Perception of Three-Dimensional Solids", Massachusetts Institute of Technology Lincoln Lab. Rep., TR3315, May 1963, pp. 1-82 (Total 82 pages).

Chi Xu et al., "Pose Estimation from Line Correspondences: A Complete Analysis and a Series of Solutions", IEEE Transactions on Pattern Analysis and Machine Intelligence, vol. 39, No. 6, Jun. 2017, pp. 1209-1222 (Total 14 pages).

* cited by examiner

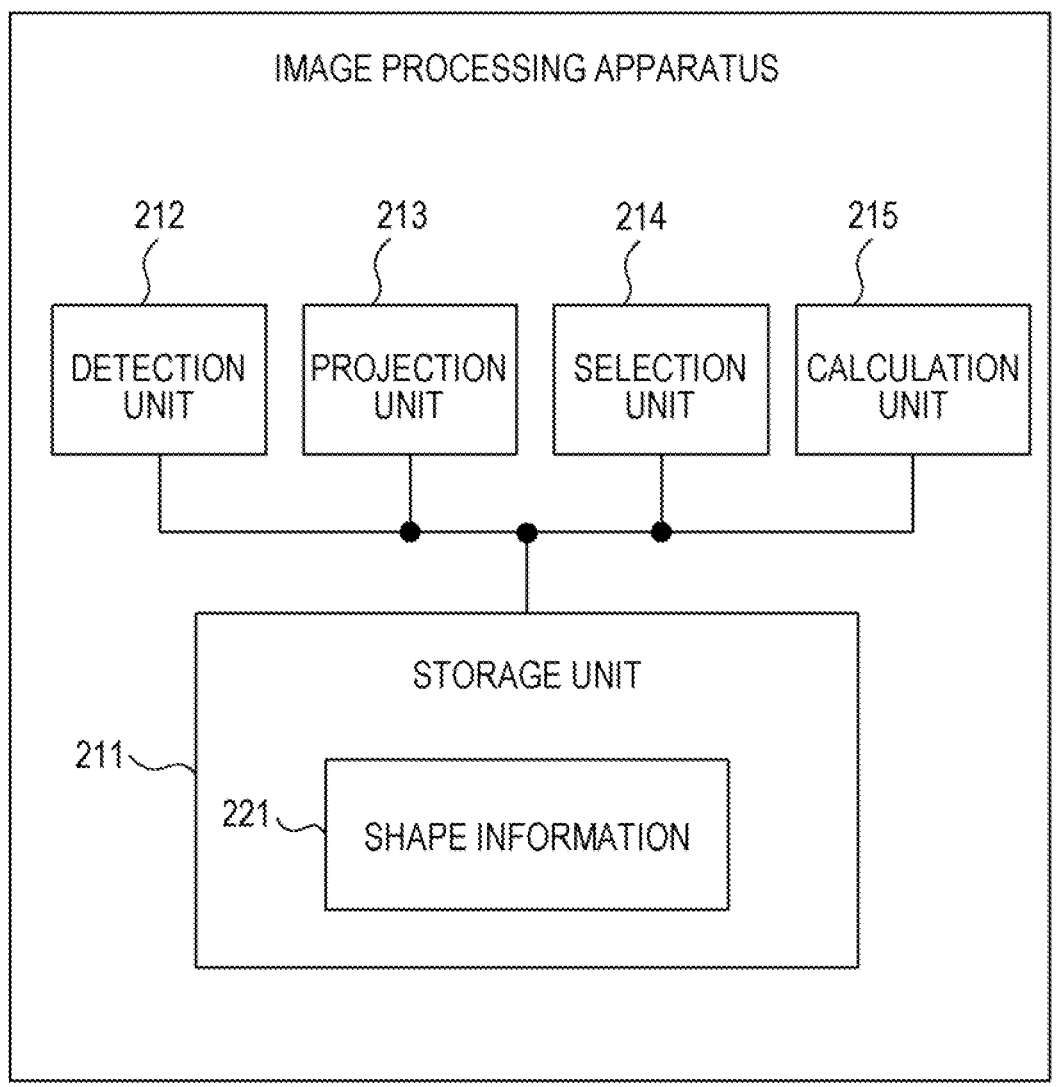

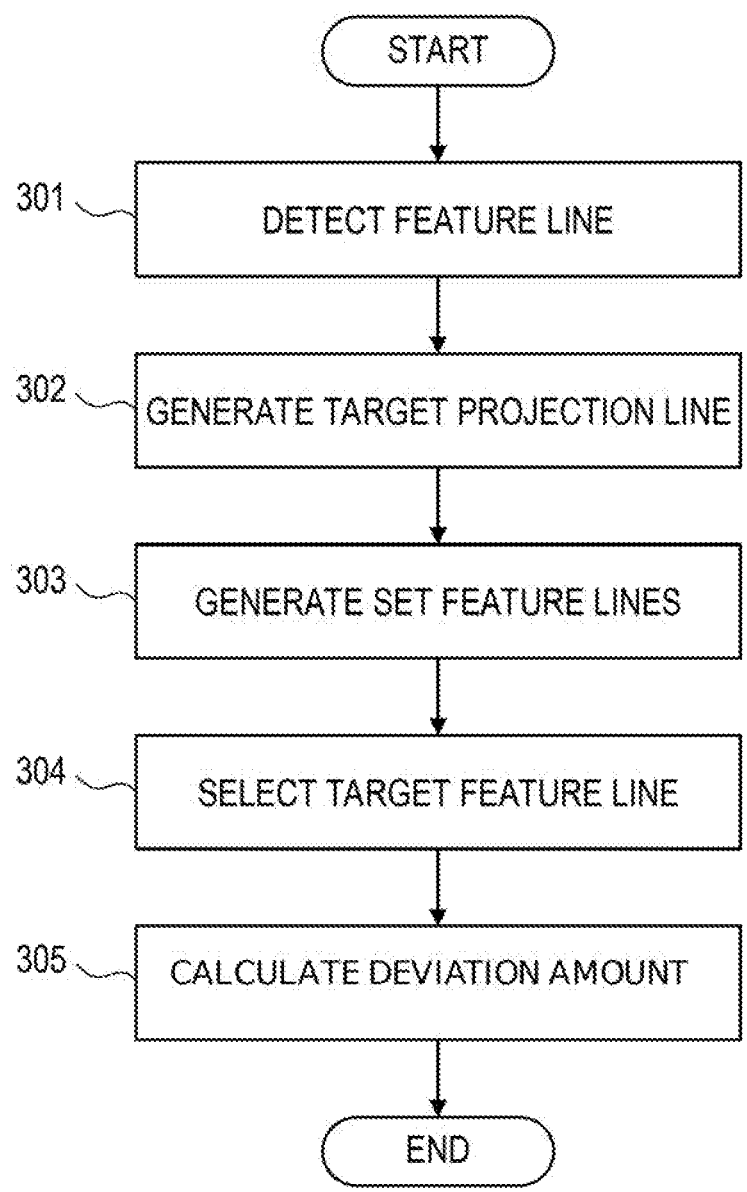

FIG. 6

| STRAIGHT LINE NUMBER | 3D LINE SEGMENT [mm] | | PROJECTION LINE | |
|---|---|---|---|---|
| | END POINT 1 | END POINT 2 | END POINT 1 | END POINT 2 |
| 0 | (49, -47.7, 5.7) | (-51, -47.7, 5.7) | (2136, 779) | (1087, 1129) |
| 1 | (-51.0, -42.7, 5.7) | (48.9, -42.7, 5.7) | (1061, 1088) | (2096, 753) |
| ... | ... | ... | ... | ... |

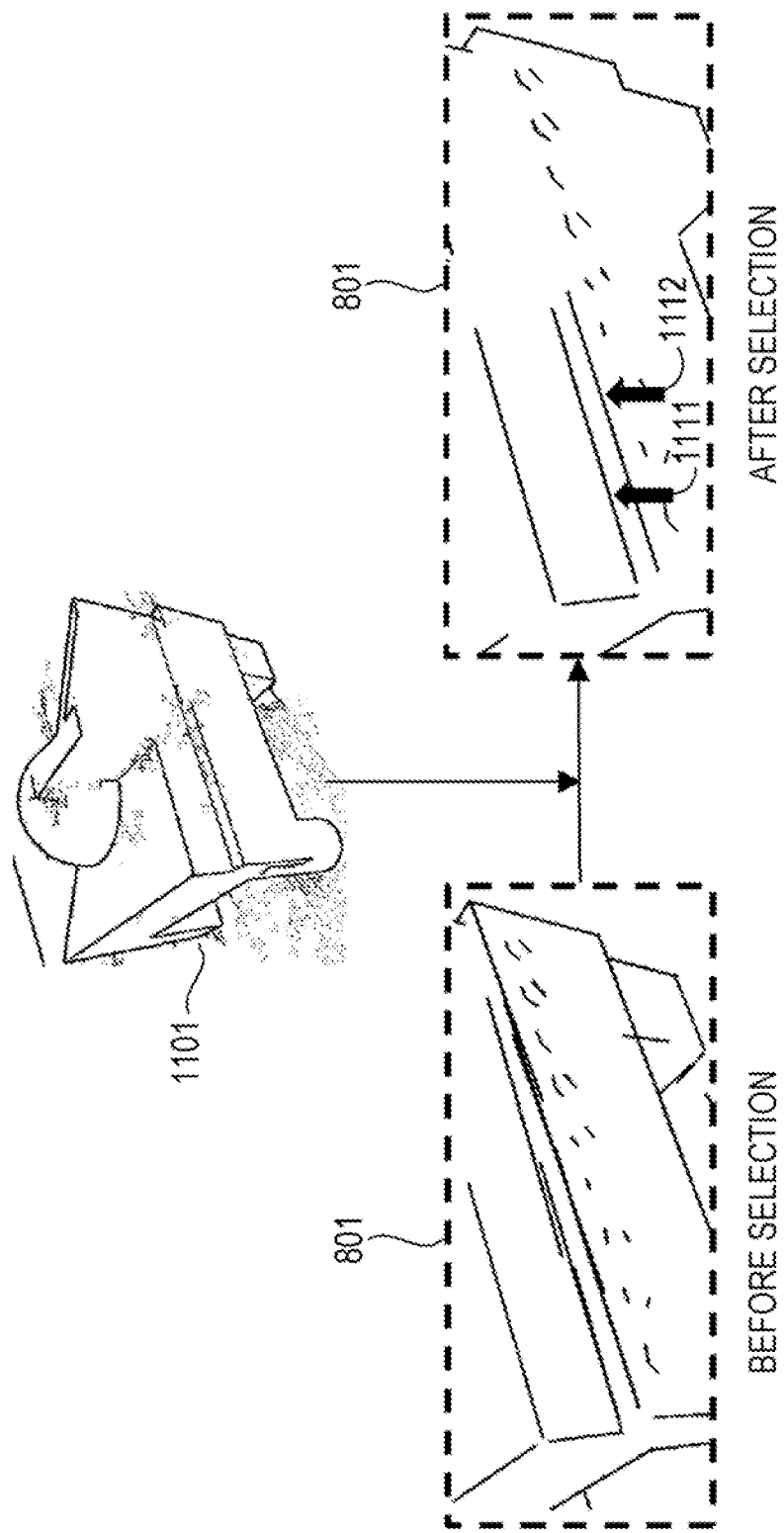

FIG. 12

| Index | IDENTIFIER | FEATURE LINE (BEFORE EXTENSION) | | FEATURE LINE (AFTER EXTENSION) | | PROJECTION LINE | | OVERLAP SCORE | SELECTION RESULT |
|---|---|---|---|---|---|---|---|---|---|
| | | END POINT 1 | END POINT 2 | END POINT 1 | END POINT 2 | END POINT 1 | END POINT 2 | | |
| 98 | 0 | (1744, 913) | (1765, 906) | (1494, 1003) | (2015, 816) | (2136, 779) | (1087, 1129) | −1 | − |
| 128 | 0 | (1651, 944) | (1689, 932) | (1407, 1026) | (1932, 850) | (2136, 779) | (1087, 1129) | −1 | − |
| 197 | 0 | (1596, 962) | (1615, 956) | (1346, 1052) | (1866, 866) | (2136, 779) | (1087, 1129) | −1 | − |
| 221 | 0 | (1287, 1065) | (1414, 1023) | (1114, 1121) | (1639, 950) | (2136, 779) | (1087, 1129) | −1 | − |
| 222 | 0 | (1114, 1122) | (1235, 1082) | (1114, 1122) | (1640, 951) | (2136, 779) | (1087, 1129) | −1 | − |
| 249 | 0 | (2075, 803) | (2132, 782) | (1733, 926) | (2132, 782) | (2136, 779) | (1087, 1129) | −1 | − |
| ... | ... | ... | ... | ... | ... | ... | ... | ... | ... |

FIG. 14

| Index | IDENTIFIER | FEATURE LINE (BEFORE EXTENSION) | | FEATURE LINE (AFTER EXTENSION) | | PROJECTION LINE | | OVERLAP SCORE | SELECTION RESULT |
| --- | --- | --- | --- | --- | --- | --- | --- | --- | --- |
| | | END POINT 1 | END POINT 2 | END POINT 1 | END POINT 2 | END POINT 1 | END POINT 2 | | |
| 98 | 0 | (1744, 913) | (1765, 906) | (1494, 1003) | (2015, 816) | (2136, 779) | (1087, 1129) | 72 | × |
| 128 | 0 | (1651, 944) | (1689, 932) | (1407, 1026) | (1932, 850) | (2136, 779) | (1087, 1129) | 118 | × |
| 197 | 0 | (1596, 962) | (1615, 956) | (1346, 1052) | (1866, 866) | (2136, 779) | (1087, 1129) | 90 | × |
| 221 | 0 | (1287, 1065) | (1414, 1023) | (1114, 1121) | (1639, 950) | (2136, 779) | (1087, 1129) | 183 | × |
| 222 | 0 | (1114, 1122) | (1235, 1082) | (1114, 1122) | (1640, 951) | (2136, 779) | (1087, 1129) | 203 | ○ |
| 249 | 0 | (2075, 803) | (2132, 782) | (1733, 926) | (2132, 782) | (2136, 779) | (1087, 1129) | 27 | × |
| ... | ... | ... | ... | ... | ... | ... | ... | ... | ... |

FIG. 17A

| pattern | INCREMENT [%] | | | | |
|---|---|---|---|---|---|
| | IMAGE NUMBER | | | | |
| | 3 | 4 | 5 | 6 | 7 |
| 1 | 17.2 | 0.0 | 3.4 | 3.1 | 0.0 |
| 2 | 17.9 | 6.7 | 13.8 | 2.9 | 0.0 |
| 3 | 6.9 | 6.7 | 10.3 | 3.1 | 0.0 |
| ave | 14.0 | 4.4 | 9.2 | 3.1 | 0.0 |

FIG. 17B

| pattern | INCREMENT [%] | | | | | |
|---|---|---|---|---|---|---|
| | IMAGE NUMBER | | | | | |
| | 1 | 2 | 3 | 4 | 5 | 6 |
| 1 | 6.1 | 9.1 | 9.5 | 15.4 | 16.7 | 16.1 |
| 2 | 21.2 | 12.1 | 0.0 | 7.7 | 10.0 | 6.5 |
| 3 | 6.3 | 17.6 | 17.4 | 3.7 | 6.7 | 12.1 |
| ave | 11.2 | 13.0 | 9.0 | 8.9 | 11.1 | 11.6 |

FIG. 20

$$\frac{1}{S} \times \begin{array}{|c|c|c|} \hline I'_1 & I'_2 & I'_3 \\ \hline I'_4 & I'_5 & I'_6 \\ \hline I'_7 & I'_8 & I'_9 \\ \hline \end{array}$$

| 0 | 0 | 0 | 0 | 0 | 0 |
|---|---|---|---|---|---|
| 0 | 0 | 250 | 250 | 0 | 0 |
| 0 | 250 | 250 | 250 | 250 | 250 |
| 250 | 250 | 250 | 0 | 0 | 0 |

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2019-46356, filed on Mar. 13, 2019, the entire contents of which are incorporated herein by reference.

FIELD

The embodiment discussed herein is related to an image processing apparatus and an image processing method.

BACKGROUND

In recent years, systems that display images by using augmented reality (AR) technology have become widespread. In an example of the AR technology, an object is captured by using a camera mounted on a personal computer (PC), a portable terminal device, and the like, and the position and orientation of the camera in 3D space are estimated from the image of the object. Then, based on the determined position and orientation of the camera, the content information is displayed at a certain position in the image in a superimposed manner.

An inspection of products at the work site where the products are manufactured is often performed by skilled workers over a period of time using a dedicated jig. However, if workers other than skilled workers may easily perform the inspection, it will be possible to reduce the inspection cost.

In connection with inspection of a product, a technique of detecting and visualizing a manufacturing failure of a product is known (see, for example, A. Moteki et al., "Manufacturing Defects Visualization via Robust Edge-Based Registration", In Adjunct Proceedings of the IEEE International Symposium on Mixed and Augmented Reality (ISMAR-Adjunct), pp. 172-173, 2018). There is also known a technique of displaying statistical information of an error representing a deviation amount between an edge position of a workpiece image and a position over a master image corresponding to the edge position along the edge position (for example, see Japanese Laid-open Patent Publication No. 2012-32344).

There is also known a technique of estimating a position of an imaging apparatus by using a predetermined number of combinations obtained by correlating projection lines obtained by projecting candidate lines included in shape information of an object over an image to the feature lines detected from the image (for example, see Japanese Laid-open Patent Publication No. 2017-182302). A technique is also known in which a correspondence result is determined based on an error in association information associated with a candidate line observed from a position of an imaging apparatus among candidate lines included in shape information of an object, and a feature line detected from an image (see, for example, Japanese Patent Application Laid-open No. 2018-055199).

Techniques such as camera calibration, line segment detection, 3D mechanical perception, orientation estimation by linear association, and edge detection based on a computational approach are also known (see, for example, Z. Zhang, "A Flexible New Technique for Camera Calibration", IEEE Transactions on Pattern Analysis and Machine Intelligence, Vol. 22, No. 11, pp. 1330-1334, November 2000, R. G. Gioi et al., "LSD: a Line Segment Detector", Image Processing On Une, 2 (2012), pp. 35-55, March 2012, L. G. Roberts, "Machine perception of three-dimensional solids", MIT Lincoln Lab. Rep., TR3315, pp. 1-82, May 1963, C. Xu et al., "Pose Estimation from Une Correspondences: A Complete Analysis and a Series of Solutions", IEEE Transactions on Pattern Analysis and Machine Intelligence, Vol. 39, No. 6, pp. 1209-1222, June 2017, and J. Canny, "A Computational Approach to Edge Detection", IEEE Transactions on Pattern Analysis and Machine Intelligence, Vol. 8, No. 6, pp. 679-698, 1986).

SUMMARY

According to an aspect of the embodiments, an image processing apparatus includes: a memory that stores shape information including a plurality of line segments representing a shape of an object; and a processor, coupled to the memory, configured to: detect a plurality of feature lines from an image of the object, generate a target projection line by projecting any of the plurality of line segments over the image of the object, extract a feature line overlapping with a predetermined region based on the target projection line over the image of the object from the plurality of feature lines to generate a set of feature lines, and select a target feature line from the set of feature lines based on gradient Information indicating a gradient of pixel values over the image of the object, and calculate a deviation amount between a line segment corresponding to the target projection line and the target feature line.

The object and advantages of the invention will be realized and attained by means of the elements and combinations particularly pointed out in the claims.

It is to be understood that both the foregoing general description and the following detailed description are exemplary and explanatory and are not restrictive of the Invention.

BRIEF DESCRIPTION OF DRAWINGS

FIG. 2 is a functional configuration diagram of an image processing apparatus;

FIG. 3 is a flowchart Illustrating image processing;

FIG. 6 is a diagram illustrating projection line information;

FIG. 78 is a diagram illustrating an example of an adjustment region generated from each projection line in FIG. 7A;

FIG. 98 is a diagram illustrating an example of an extended feature line generated by using an adjustment region obtained by expanding the projection line in a width direction;

FIG. 11 is a diagram illustrating target feature line selection processing;

FIG. 12 is a diagram illustrating a set of feature lines;

FIG. 14 is a diagram illustrating a calculation result of an overlap score;

FIG. 17A is a diagram illustrating experimental results for an object, and FIG. 17B is a diagram illustrating experimental results for an object;

FIG. 20 is a diagram illustrating an edge detection filter after redistribution;

FIG. 23A is a diagram illustrating an example of a gradient image, FIG. 23B is a diagram illustrating an example of overlap score calculation processing without using the gradient direction of each pixel, and FIG. 23C is a diagram illustrating an example of a unit vector indicating the normal direction of each pixel.

DESCRIPTION OF EMBODIMENTS

In the background art described above, according to the technique of A. Moteki et al., "Manufacturing Defects Visualization via Robust Edge-Based Registration", In Adjunct Proceedings of the IEEE International Symposium on Mixed and Augmented Reality (ISMAR-Adjunct), pp. 172-173, 2018, a 3D line segment included in a computer-aided design (CAD) model of a product is projected over an image to generate a projection line, and a feature line (a 2D line segment) is detected from the image of the product. Then, based on the size of the CAD model, the position and orientation of the camera, and the distance between the feature line and the projection line, a deviation amount (error) between the product and the CAD model is displayed. Furthermore, based on the coupling relationship between the feature lines and the coupling relationship between the 3D line segments, the defective parts of the product are highlighted.

Further, according to the technique of Japanese Patent Application Laid-open No. 2012-32344, a geometric figure such as a straight line or a circular arc is fitted to a plurality of points over an edge detected based on a luminance change of a work image based on a statistical method such as a least squares method, thereby obtaining a boundary line between an object and a background.

However, there may be a case where a feature line representing the boundary line is not correctly detected with respect to the boundary line between the surface and the surface of the object appearing in the image or the boundary line between the object and the background. If the feature line representing the boundary line is not correctly detected, it is difficult to select an optimal feature line having a position and an inclination similar to the boundary line over the image. When the deviation amount between the shape of the object and the CAD model is calculated by using the feature line other than the optimal feature line, a correct deviation amount is not displayed.

This problem is not limited to the case where a product manufacturing defect portion is displayed by using a CAD model, but also occurs in a case where an error in the shape of an object is specified by using other shape information.

Hereinafter, an embodiment will be described in detail with reference to drawings.

Figure 1A:
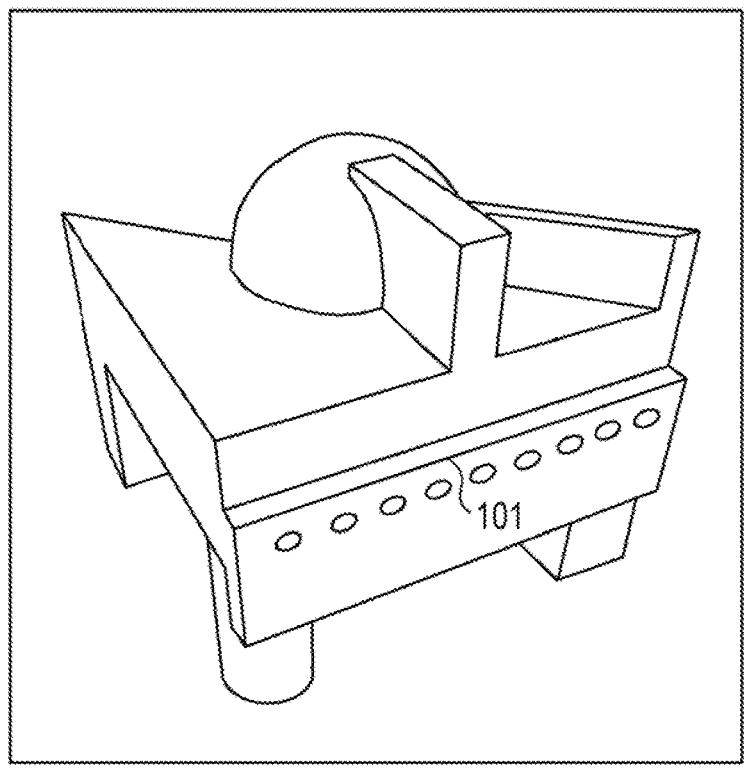
FIG. 1A illustrates an example of an image of an object.
Figure 1B:
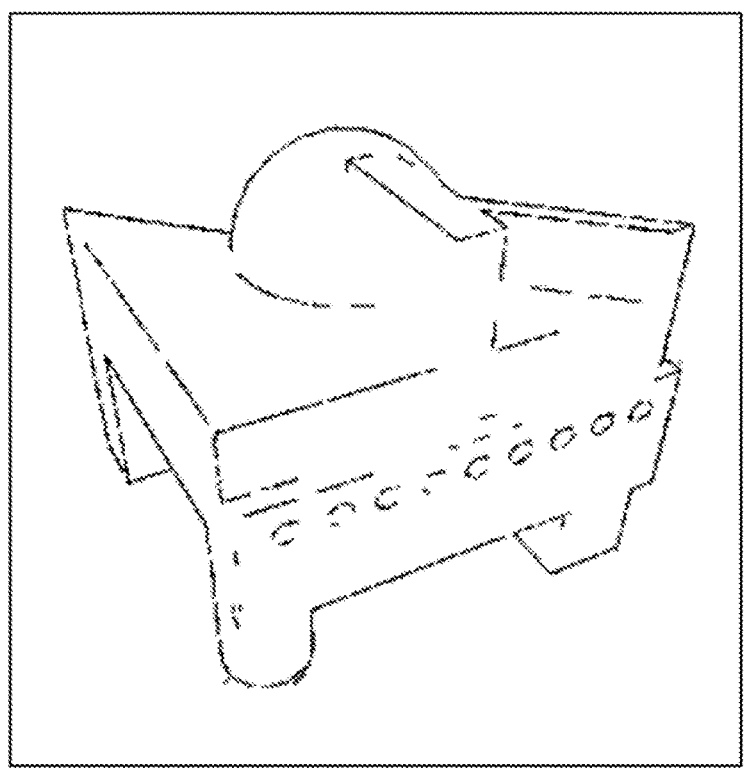
FIG. 1B illustrates an example of a feature line detected from the image of FIG. 1A.

FIGS. 1A and 1B illustrate an example of an insufficient feature line detected from an image of an object. FIG. 1A illustrates an example of an image of an object, and FIG. 1B illustrates an example of a feature line detected from the image illustrated in FIG. 1A. For example, with respect to a boundary line 101 illustrated in FIG. 1A, in FIG. 1B, instead of one feature line having the same length as the boundary line 101, a plurality of segmented feature lines that are shorter than the boundary line 101 are detected. Instead of a plurality of segmented feature lines, only one feature line that is shorter than the boundary line may be detected.

In the detection method of A. Moteki et al., "Manufacturing Defects Visualization via Robust Edge-Based Registration", In Adjunct Proceedings of the IEEE International Symposium on Mixed and Augmented Reality (ISMAR-Adjunct), pp. 172-173, 2018, even when a plurality of feature lines are detected from one boundary line, these feature lines are not distinguished. In the detection method of Japanese Patent Application Laid-open No. 2012-32344, when the edge points to be used are different depending on an edge detection result or a selection method, a fitting result by a geometrical figure changes, but the line segment obtained by fitting is not evaluated.

In this way, when the feature line representing the boundary line is not correctly detected from the image of the object, it is difficult to select an optimal feature line having a position and an inclination similar to the boundary line over the image. When the deviation amount between the shape of the object and the CAD model is calculated by using the feature line other than the optimal feature line, a correct deviation amount is not displayed.

Therefore, a method may be considered in which a threshold value is set for the length of the feature line, and only feature lines having a length equal to or greater than the threshold value are extracted, but it is difficult to set an appropriate threshold value. If the threshold value is too large, a short optimal feature line is excluded, and if the threshold value is too small, a large amount of noise is included in the extraction result, making it difficult to select an optimal feature line.

A method is also conceivable in which a threshold value is set for the similarity between distances and inclinations of feature lines, and feature lines having similarities equal to or greater than the threshold value are integrated, but it is difficult to set an appropriate threshold value in this case as well. If the threshold value is too large, none of the plurality of feature lines is integrated, and if the threshold value is too small, a large number of noises are integrated to generate a feature line having an inclination different from the inclination of the boundary line appearing in the image.

FIG. 2 illustrates an example of a functional configuration of an image processing apparatus according to an embodiment. An image processing apparatus 201 in FIG. 2 includes a storage unit 211, a detection unit 212, a projection unit 213, a selection unit 214, and a calculation unit 215. The storage unit 211 stores shape information 221 including a plurality of line segments representing the shape of the object.

FIG. 3 is a flowchart illustrating an example of image processing performed by the image processing apparatus 201 in FIG. 2. First, the detection unit 212 detects a plurality of feature lines from an image of an object (step 301). Then, the projection unit 213 projects any of the plurality of line segments included in the shape information 221 over the image of the object to generate a target projection line (step 302).

Next, the selection unit 214 extracts, from among the plurality of feature lines, a feature line overlapping with a predetermined region based on the target projection line over the image of the object to generate a set of feature lines (step 303). Next, the selection unit 214 selects the target feature line from the set of feature lines based on gradient information indicating the gradient of a pixel value over the image of the object (step 304). Then, the calculation unit 215 calculates the deviation amount between the line segment corresponding to the target projection line and the target feature line (step 305).

According to the image processing apparatus 201 in FIG. 2, it is possible to identify an error in the shape of an object by using the shape information of the object and the feature line detected from the image of the object.

Figure 4:
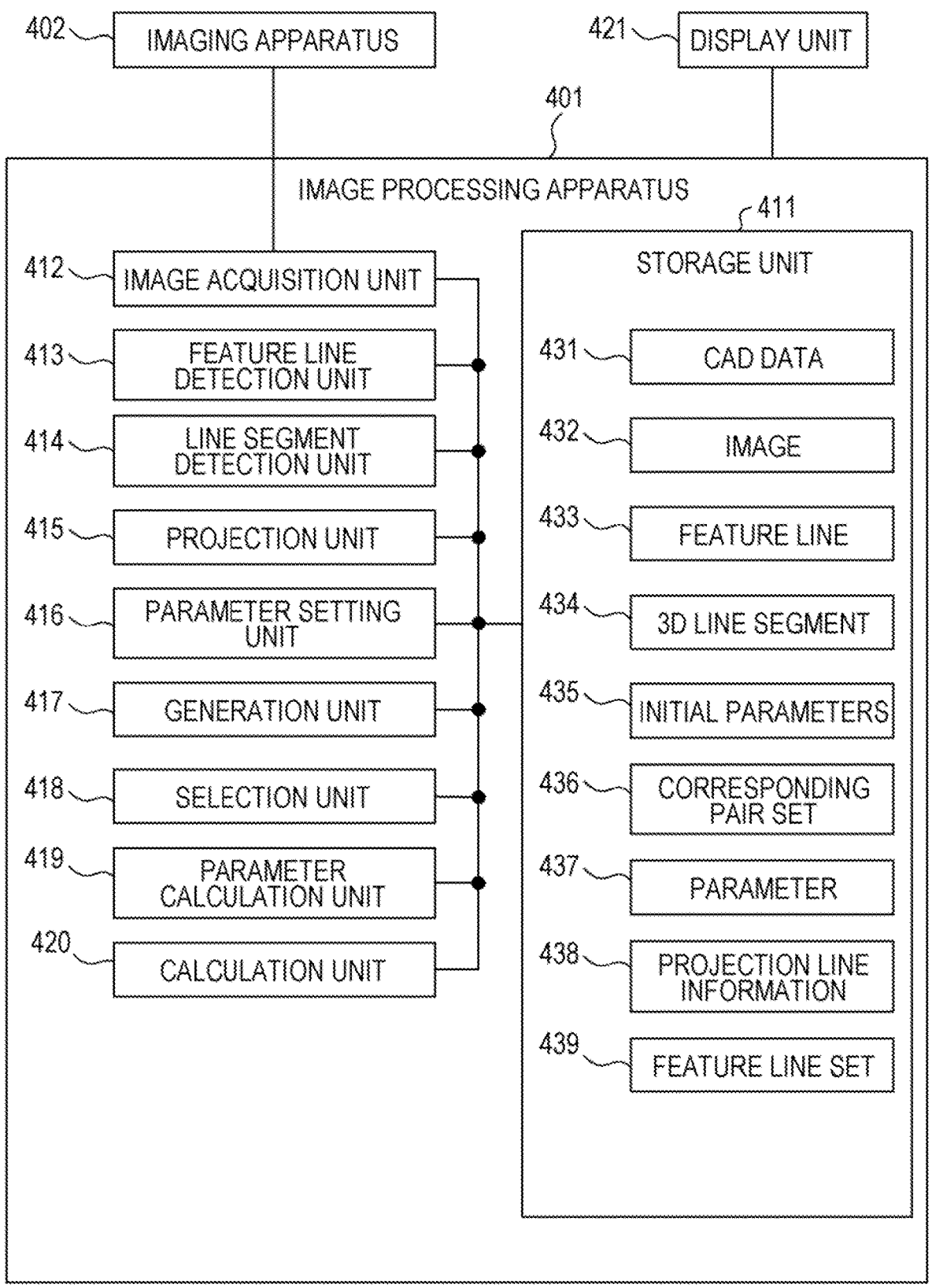
FIG. 4 is a functional configuration diagram illustrating a specific example of the image processing apparatus.

FIG. 4 illustrates a specific example of the image processing apparatus 201 in FIG. 2. An image processing apparatus 401 in FIG. 4 includes a storage unit 411, an image acquisition unit 412, a feature line detection unit 413, a line segment detection unit 414, a projection unit 415, a parameter setting unit 416, a generation unit 417, a selection unit 418, a parameter calculation unit 419, a calculation unit 420, and a display unit 421. The display unit 421 may be coupled via an interface or may be incorporated in an image processing apparatus 401. The display unit 421 may be configured as a display.

The storage unit 411, the feature line detection unit 413, the projection unit 415, the selection unit 418, and the calculation unit 420 correspond to the storage unit 211, the detection unit 212, the projection unit 213, the selection unit 214, and the calculation unit 215 in FIG. 2, respectively.

The image processing apparatus 401 is used in shape inspection for inspecting the shape of the object using the shape information of the object. The image processing apparatus 401 may be a portable terminal device such as a tablet, a laptop personal computer (PC), and a smart device, or may be an information processing apparatus such as a desktop PC.

The storage unit 411 stores CAD data 431. The CAD data 431 corresponds to the shape information 221 in FIG. 2 and includes vertex information of a plurality of vertices representing the 3D shape of the object and line segment information of a plurality of line segments. The vertex information includes 3D coordinates of each vertex of the object, and the line segment information includes identification information representing vertices at both ends of each line segment, or 3D coordinates of vertices at both ends of each line segment. The CAD data 431 may be OBJ format data.

An imaging apparatus 402 is a camera having imaging elements (image sensor) such as charged-coupled device (CCD), complementary metal-oxide-semiconductor (CMOS), and the like and captures an image 432 of an object represented by the CAD data 431. The image acquisition unit 412 acquires the image 432 from the imaging apparatus 402 and stores the acquired image in the storage unit 411.

The feature line detection unit 413 performs edge detection processing to detect a plurality of edge lines from the image 432 and stores the detected edge line in the storage unit 411 as a feature line 433. The feature line detection unit 413 may detect an edge line from the image 432 by using the technique of R. G. Gioi et al., "LSD: a Une Segment Detector", Image Processing On Une, 2 (2012), pp. 35-55, March 2012, for example.

The line segment detection unit 414 detects a plurality of line segments included in the CAD data 431 and stores the detected plurality of line segments in the storage unit 411 as a plurality of 3D line segments 434. The projection unit 415 projects the object represented by the CAD data 431 over the image 432 to generate a projection line, and the display unit 421 displays the image 432 over the screen and displays the shape of the object over the screen by using the projection line.

The parameter setting unit 416 sets an initial parameter 435 representing the initial position and initial orientation of the imaging apparatus 402 in the 3D space. First, the user performs an operation for changing the position and orientation of the shape of the object over the screen so that the position and orientation of the shape of the displayed object are approximate to the object appearing in the image 432. The position and orientation of the viewpoint with respect to the screen is changed by changing the position and orientation of the object on the image on the screen.

Therefore, the parameter setting unit 416 uses the position and orientation of the viewpoint corresponding to the position and orientation of the shape of the object determined by the user as the initial position and initial orientation of the imaging apparatus 402. Then, the parameter setting unit 416 stores the parameters representing the initial position and initial orientation in the storage unit 411 as initial parameters 435.

The generation unit 417 removes 3D line segments (hidden lines) that are not observed from the viewpoint from among the 3D line segments included in the shape of the object. The generation unit 417 may remove the hidden line using the technique of L. G. Roberts, "Machine perception of three-dimensional solids", MIT Lincoln Lab. Rep., TR 3315, pp. 1-82, May 1963, for example.

The parameter setting unit 416 may also automatically determine the initial parameters 435 using the technique described in Japanese Patent Application No. 2017-195787 which is the prior application. According to this technique, orientation information representing the position and orientation of an object observed from each of a plurality of viewpoints in a 3D space, a viewpoint image of the observed object, and a feature amount extracted from the viewpoint image are stored in the storage unit in correlation with each other. Then, the degree of similarity between the feature amount of the image captured by the imaging apparatus and the feature amount of each viewpoint image is calculated, and the orientation Information of the viewpoint image having the maximum degree of similarity is determined as the orientation information representing the initial position and the initial orientation of the object.

The initial position and the initial orientation represented by the initial parameter 435 are temporary positions and orientations and do not necessarily coincide with the position and orientation of the imaging apparatus 402 when the image 432 was captured.

Next, the user designates k (k is a certain integer equal to or greater than 4) combinations of the projection lines and feature lines from the projection line or the feature line 433 of the 3D line segment 434 displayed over the screen. The generation unit 417 uses a combination (corresponding pair) of the 3D line segment represented by the designated projection line and the designated feature line as the initial corresponding pair. In this case, k initial corresponding pairs are generated.

The generation unit 417 may automatically determine an initial correspondence pair by using the technique described in Japanese Patent Application Laid-open No. 2018-055199. According to this technique, a plurality of feature lines satisfying a predetermined condition are extracted from a plurality of feature lines detected from an image. Next, k corresponding pairs are generated from the extracted feature lines and the remaining 3D line segments from which the hidden line has been removed, and the sum of errors between the position of the projection line of the 3D line segment included in each corresponding pair and the position of the feature line is calculated. Then, the calculating the sum of the errors is repeated, while changing the combination of the 3D line segment and the feature line included in the k corresponding pairs, and k corresponding pairs having a minimum total sum of the errors are determined as k initial corresponding pairs.

The parameter calculation unit 419 calculates the position and orientation of the imaging apparatus 402 at the time of capturing the image 432 using the k initial corresponding pairs. The parameter calculation unit 419 may calculate a 3×3 rotation matrix R and a translation vector T representing the position and orientation from k initial corresponding pairs by using the technique of C. Xu et al., "Pose Estimation from Une Correspondences: A Complete Analysis and a Series of Solutions", IEEE Transactions on Pattern Analysis and Machine Intelligence, Vol. 39, No. 6, pp. 1209-1222, June 2017, for example.

The projection unit 415 projects the 3D line segment 434 over the image 432 by using the position and orientation of the imaging apparatus 402 calculated by the parameter calculation unit 419 to generate a projection line, and stores the projection line information 438 indicating the correspondence between the projection line and the 3D line segment 434 in the storage unit 411. For example, the projection unit 415 may project the 3D line segment 434 over the image 432 by the following equation.

$$\begin{pmatrix} u \\ v \\ 1 \end{pmatrix} = A \begin{pmatrix} R & T \\ 0 & 1 \end{pmatrix} \begin{pmatrix} X \\ Y \\ Z \\ 1 \end{pmatrix} \quad (1)$$

The definitions of (X, Y, Z), A, R, T and (u, v) of Equation (1) are as follows.

(X, Y, Z): 3D coordinates of the end point of the 3D line segment
A: internal parameters of the imaging apparatus 402
R: 3×3 rotation matrix
T: translation vector
(u, v): 2D coordinates of the end point of the projection line over the image 432

An internal parameter A of the imaging apparatus 402 may be measured in advance by using the technique of Z. Zhang, "A Flexible New Technique for Camera Calibration", IEEE Transactions on Pattern Analysis and Machine Intelligence, Vol. 22, No. 11, pp. 1330-1334, November 2000, for example.

Next, the generation unit 417 selects the projection line of the additional 3D line segment to be added to the initial corresponding pair from among the projection lines included in the projection line information 438, selects an additional feature line correlated with the additional 3D line segment from the feature line 433, and generates an additional corresponding pair obtained by correlating the additional 3D line segment and the additional feature line with each other. Then, the generation unit 417 stores the set of the initial corresponding pairs and the additional corresponding pairs in the storage unit 411 as the set of corresponding pairs 436. Therefore, the number N of corresponding pairs included in the set of corresponding pairs 436 is equal to or greater than k+1.

For example, the generation unit 417 may select the projection line of the additional 3D line segment in a descending order of the length of the projection lines using the technique of Japanese Laid-open Patent Publication No. 2017-182302, and select the feature line that satisfies the following condition with respect to the selected projection line as the additional feature line.

(C1) Distance between midpoint of the projection line and midpoint of the feature line<threshold value
(C2) Angle formed by the projection line and the feature line<threshold value An upper limit may be provided for the number of the additional feature lines. In addition, since there is a possibility that two or more segmented feature lines are detected from one side (boundary line) of an object, when two or more feature lines are present over the same straight line, the generation unit 417 may select only one feature line as the additional feature line. Further, the generation unit 417 may exclude feature lines shorter than a predetermined value from the candidate additional feature lines. For example, a value of 5% to 20% of the length of the longest feature line may be used as the predetermined value.

Next, the selection unit 418 uses the short feature lines excluded from the candidates of the additional feature lines to further generate a corresponding pair, and updates the set of corresponding pairs 436 by adding the generated correspondence pair to the set of corresponding pairs 436.

First, the selection unit 418 uses the projection line included in the projection line information 438 as a target projection line to generate an adjustment region for adjusting the feature line over the image 432. The adjustment region is an example of a predetermined region based on the target projection line. For example, the selection unit 418 may generate an adjustment region by expanding the target projection line in the width direction or shortening the target projection line in the length direction.

Next, the selection unit 418 extracts one or more feature lines overlapping with the adjustment region from a plurality of feature lines 433 to generate a set of extracted feature lines, and stores the generated set of feature lines in the storage unit 411 as a set of feature lines 439. For example, the selection unit 418 extracts a feature line that is partially or entirely included in the adjustment region among the plurality of feature lines 433, as a feature line overlapping with the adjustment region.

It is possible to increase candidates for feature lines associated with the target projection line by extracting feature lines partially included in the adjustment region together with feature lines entirely included in the adjustment region.

The selection unit 418 selects the target feature line from the set of feature lines 439 based on the gradient information indicating the gradient of the pixel values over the image 432 to generate a corresponding pair in which the 3D line segment corresponding to the target projection line and the target feature line are associated, and adds the corresponding pair to the set of corresponding pairs 436.

For example, the selection unit 418 generates a gradient image including the gradient intensity of the pixel value over the image 432 as a pixel value of each pixel by using the technique of J. Canny, "A Computational Approach to Edge Detection", IEEE Transactions on Pattern Analysis and Machine Intelligence, Vol. 8, No. 6, pp. 679-698, 1986, and extends the feature line included in the set of feature lines 439 in the length direction to generate an extended feature line. The gradient of pixel values represents a change in pixel values, and the gradient intensity represents the magnitude of a change in pixel values.

Next, the selection unit 418 calculates an evaluation value for each of the plurality of extended feature lines based on the pixel values of the pixels through which each of the plurality of extended feature lines generated from the set of feature lines 439 passes over the gradient image. The selection unit 418 selects a specific extended feature line based on the evaluation values of the plurality of extended feature lines, and selects a feature line before extension corresponding to the extended feature line as a target feature line.

Next, the parameter calculation unit 419 selects k corresponding pairs from N corresponding pairs included in the set of corresponding pairs 436, and uses the selected k corresponding pairs to calculate the position and orientation of the imaging apparatus 402. Then, the parameter calculation unit 419 stores the parameters representing the calculated position and orientation in the storage unit 411 as a parameter 437. For example, R and T in Equation (1) may be used as the parameter 437.

The parameter calculation unit 419 repeats the processing of calculating the parameter 437 a plurality of times while changing the selection of the k corresponding pairs. The projection unit 415 generates N-k projection lines by projecting the 3D line segments included in the remaining N-k corresponding pairs in the set of corresponding pairs 436 over the image 432 by using R and T represented by the parameter 437 every time the parameter 437 is calculated.

Next, the parameter calculation unit 419 calculates an error between the position of the generated projection line and the position of the feature line included in the corresponding pair, and calculates a statistical value of the error of each of the N-k corresponding pairs. A median value, an average value, a minimum value, or the like may be used as the calculated statistical value of the error. The parameter calculation unit 419 obtains the minimum value of the statistical value calculated by using the respective parameters 437, and selects the parameter 437 used to calculate the obtained minimum value.

Next, the projection unit 415 projects the 3D line segment included in the set of corresponding pairs 436 over the image 432 by using R and T represented by the selected parameter 437 to generate a projection line. Thus, the shape of the object represented by the CAD data 431 is superimposed on the image 432. Then, the calculation unit 420 calculates an error between the position of the projection line generated and the position of the feature line included in the corresponding pair, and calculates the deviation amount between the 3D line segment corresponding to the projection line and the feature line based on the calculated error.

The display unit 421 displays a part or all of the set of corresponding pairs 436 over the screen to display the shape of the object and the image 432 in a superimposed manner. Further, the display unit 421 displays the deviation amount calculated for each pair of corresponding pairs displayed.

Figure 5:
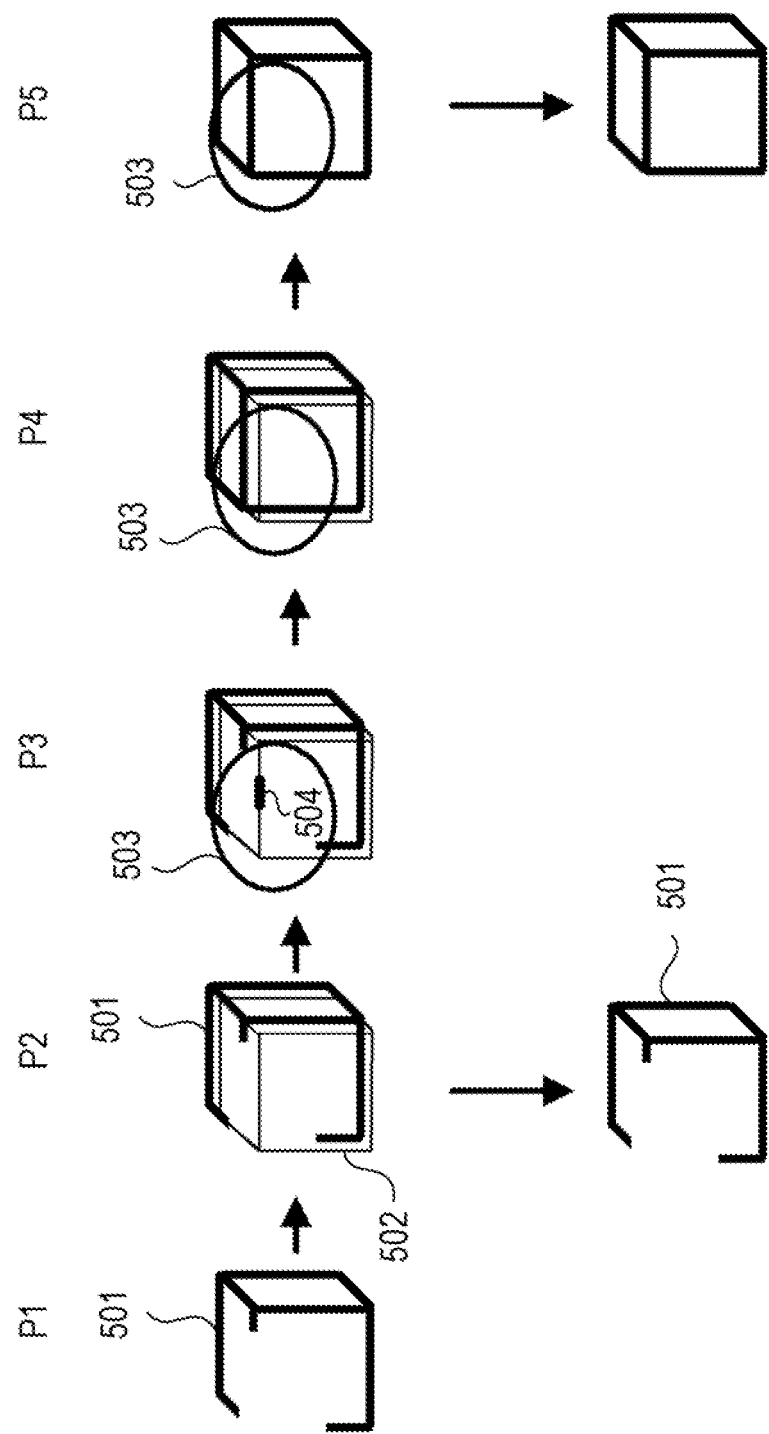
FIG. 5 is a diagram illustrating image processing.

FIG. 5 illustrates an example of image processing performed by the image processing apparatus 201 in FIG. 2. First, the feature line detection unit 413 detects a feature line 501 from an image of an object having a cubic shape (step P1). In this example, 9 ridge lines of the 12 edges (boundary lines) of the object appear in the image, and 9 feature lines 501 representing the ridge lines are detected. The length of the 6 feature lines 501 is equal to or greater than a predetermined value, and the length of the remaining 3 feature lines 501 is shorter than the predetermined value.

Next, the projection unit 415 generates a projection line 502 of the 3D line segment included in the CAD data of the object, and the display unit 421 and displays the projection line 502 and the feature line 501 over the screen (procedure P2) In a superimposed manner. The generation unit 417 generates the set of corresponding pairs 436 by excluding the feature line 501 which is shorter than a predetermined value.

In procedure P2, when the deviation amount between the 3D line segment and the feature line is displayed by using the set of corresponding pairs 436 before the corresponding pair is added by the selection unit 418, 6 feature lines 501 having a length equal to or greater than the predetermined value are displayed as the display targets of the deviation amount.

Next, the selection unit 418 generates an adjustment region based on each projection line within a region 503 where there may exist the ridge lines corresponding to the 3 feature lines shorter than the predetermined value (step P3). In addition to the 9 feature lines 501, a feature line 504 shorter than the predetermined value may also be included in the region 503.

Therefore, the selection unit 418 extends a plurality of short feature lines overlapping with each adjustment region to generate a plurality of extended feature lines (procedure P4), and selects a specific extended feature line based on the evaluation values of the respective extended feature lines (procedure P5).

In procedure P5, the selection unit 418 adds the three corresponding pairs to the set of corresponding pairs 436 by using the feature line before extension corresponding to the specific extended feature line, thereby the 9 feature lines become display targets of the deviation amount. Therefore, the number of display targets of the deviation amount is increased by 3 compared to the case where the deviation amount is displayed in the procedure P2.

According to the image processing apparatus 401 illustrated in FIG. 4, even when a plurality of segmented feature lines that are shorter than the boundary line of the object are detected from the image, it is possible to select an optimal feature line to identify an error in the shape of the object. Since the number of display targets of the deviation amount is increased by selecting an optimal feature line from among a plurality of segmented feature lines, it is possible to inspect the shape of the object in more detail. For example, an opportunity to find manufacturing defects is increased in the shape inspection of the product, and thus the defective product may be not be shipped.

FIG. 6 illustrates an example of the projection line information 438. The projection line information 438 in FIG. 6 includes a straight line number, an end point 1 and an end point 2 of a 3D line segment, and an end point 1 and an end point 2 of a projection line. The straight line number is identification information of the 3D line segment, the end point 1 of the 3D line segment represents the 3D coordinates of one end point of the 3D line segment, and the end point 2 of the 3D line segment represents the 3D coordinates of the other end point of the same 3D line segment. The end point 1 of the projection line represents the 2D coordinates of one end point of the projection line corresponding to the 3D line segment, and the end point 2 of the projection line represents the 2D coordinates of the other end point of the same projection line. The unit of 3D coordinates is mm, and the unit of 2D coordinates is the number of pixels.

Figure 7A:
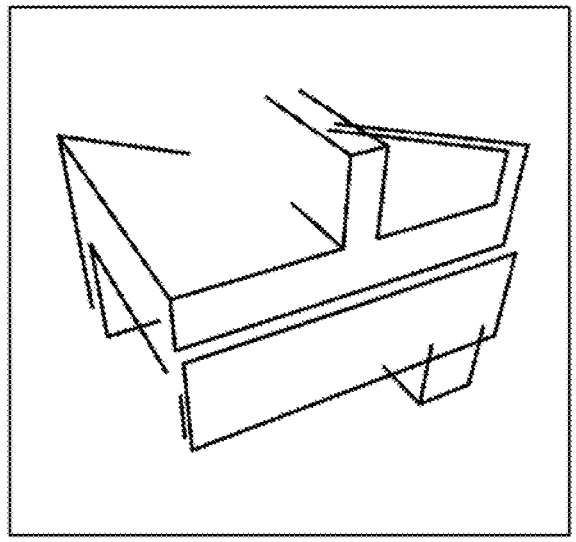
FIG. 7A is a diagram illustrating an example of a projection line of the object Illustrated in FIG. 1A.
Figure 7B:
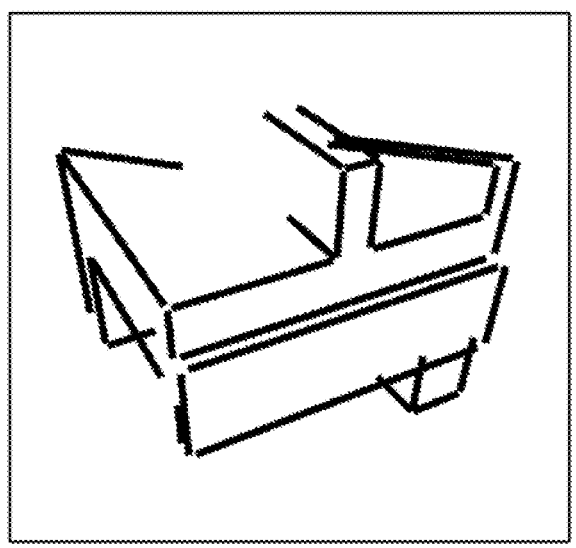

FIGS. 7A and 7B illustrate an example of the adjustment region generated by the selection unit 418. FIG. 7A illustrates an example of a projection line of the object Illustrated in FIG. 1A, and FIG. 7B illustrates an example of an adjustment region generated from each projection line in FIG. 7A. Each thick line in FIG. 7B represents one adjustment region.

By expanding each projection line in FIG. 7A in the width direction and shortening in the length direction, each adjustment region in FIG. 7B is generated. For example, when the thickness of the projection line is one pixel, the thickness of the adjustment region may be 5 pixels to 15 pixels. The length of the adjustment region may be 90% to 95% of the projection line.

Figure 8:
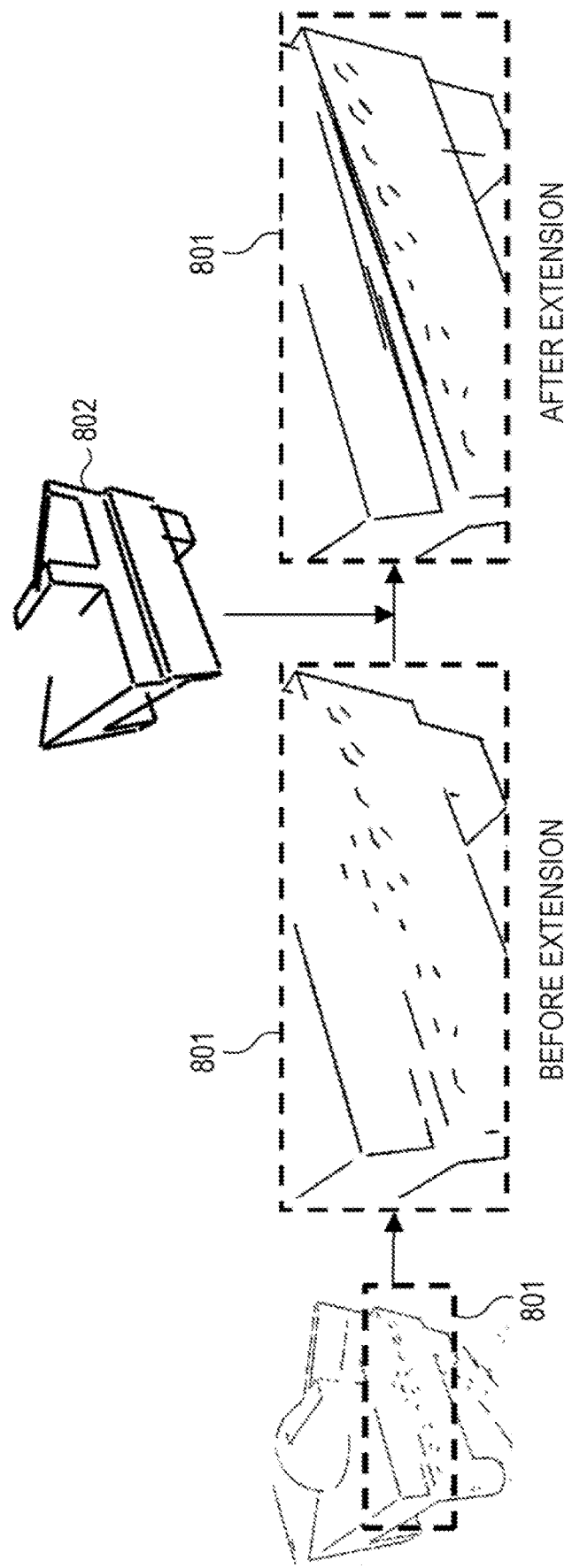
FIG. 8 is a diagram illustrating feature line extension processing.

FIG. 8 illustrates an example of the feature line extension processing performed by the selection unit 418. The selection unit 418 selects a plurality of feature lines overlapping with each of the adjustment regions 802 among the short feature lines in the region 801 before the extension, which are detected from the image of the object Illustrated in FIG. 1A. For example, when the midpoint of the feature line is included in the adjustment region 802, the selection unit 418 determines that the feature line overlaps with the adjustment region 802.

Next, the selection unit 418 assigns group identification information indicating the same group to each of the adjustment regions 802 and the selected plurality of feature lines. Thus, these feature lines and the adjustment region 802 are associated with each other. For example, the identification information of the projection line corresponding to each adjustment region 802 is used as the group identification information.

As illustrated in the extended region 801, the selection unit 418 extends the feature lines for each of the groups of feature lines to generate an extended feature line. At this time, the extended feature line is generated under the following conditions.

(C11) The length of the extended feature line does not exceed the maximum length determined based on the length of the projection line. (C12) Extend from one or both of two end points of the feature line in the length direction of the feature line. (C13) The end point of the extended feature line is included in the adjustment region.

For example, as the maximum length of the extended feature line of each group, a value of 40% to 60% of the length of the projection line having the group identification information of the group may be used. Based on the conditions (C11) to (C13), the selection unit 418 extends the end point side of an m-th (m=1, 2, ...) feature line to which an identifier n is assigned as the group identification information, for example, by using the following equation.

$$Pe'(m,t)=Pe(m)+tEse(m)(t=0,1,2,...).$$

$$\{Pe'(m,t)||Pe'(m,t)-Ps(m)|\leq 0.5L, Pe'(m,t)\in Xn\} \quad (2)$$

The definitions of Ps(m), Pe(m), Pe'(m, t), Ese(m), t, L, and Xn in Equation (2) are as follows.

Ps(m): a vector representing the 2D coordinates of the start point of the m-th feature line Pe(m): a vector representing the 2D coordinates of the end point of the m-th feature line Pe'(m, t): a vector representing the 2D coordinates of the end point of the extended m-th feature line Ese(m): a unit vector in the direction from the start point of the m-th feature line toward the end point.

t: a parameter representing the amount of change in the 2D coordinates

L: a length of the projection line corresponding to an adjustment region having the identifier n Xn: a set of vectors representing the 2D coordinates of pixels included in an adjustment region having the identifier n The selection unit 418 extends the start point side of the m-th feature line by using the following equation.

$$Ps'(m,t)=Ps(m)+tEes(m)(t=0,1.2,...),$$

$$\{Ps'(m,t)||Ps'(m,t)-Pe(m)|\leq 0.5L, Ps'(m,t)\in Xn\} \quad (3)$$

The definitions of Ps'(m, t) and Ees(m) of Equation (3) are as follows.

Ps'(m, t): a vector representing the 2D coordinates of the start point of the extended m-th feature line Ees(m): a unit vector from the end point of the m-th feature line toward the start point When such feature line extension processing is described by using a pseudo code, the following will be described.

```
for all feature lines
    if an identifier n is assigned to a feature line
    if the length of the feature line is 50% or more of L
    end
    else
    while true
    Ps'(m, t) is calculated by Equation (3) from Ps(m) and t
    if Ps'(m, t) is included in Xn
    the length of the feature line when updated to Ps'(m, t) is less than 50% of L
    Ps(m) is updated to Ps'(m, t)
    end
    Pe'(m, t) is calculated from Pe(m) and t by Equation (2)
```

```
         if Pe'(m, t) is included in Xn
           the length of the feature line when updated to Pe'(m, t) is 50% of
L
           Pe(m) is updated to Pe'(m, t)
         end
         neither if Ps(m) nor Pe(m) has been updated
           exit from while
         end
         increment t by 1
       end
     end
       endend
```

Even when an error is included in the position and orientation of the imaging apparatus 402 calculated by using the k initial corresponding pairs by expanding the projection line in the width direction, it is possible to include a feature line existing around the projection line in the group of projection lines. Even when the calculated position and orientation of the imaging apparatus 402 include an error, it is possible to suppress the extension of the feature line to a region where the boundary line of the object does not exist by shortening the projection line in the length direction.

Figure 9A:
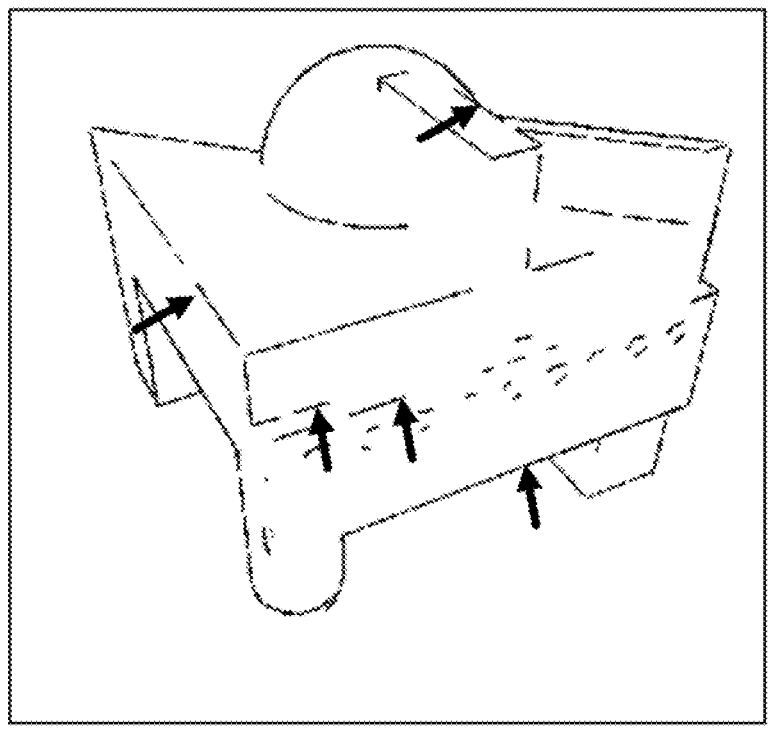
FIG. 9A is a diagram illustrating an example of an extended feature line generated from the image of the object illustrated in FIG. 1A by using an adjustment region having the same thickness as the projection line.
Figure 9B:
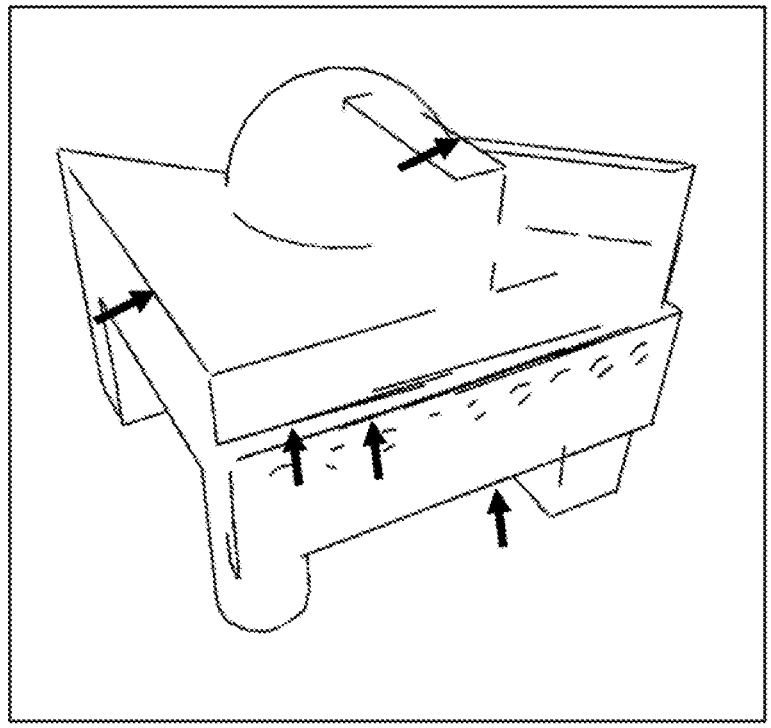

FIGS. 9A and 9B Illustrate an example of the effect obtained when the projection line is expanded in the width direction. FIG. 9A illustrates an example of an extended feature line generated by using the adjustment region having the same thickness as that of the projection line from the image of the object illustrated in FIG. 1A. In this case, the result of overlapping the projection line on the image 432 is slightly deviated, the short feature line existing around the projection line does not overlap with the adjustment region, and the feature line is excluded from the selection target. Therefore, there is a high possibility that a short optimal feature line will not be selected. The five arrows in FIG. 9A indicate the positions of feature lines that are excluded from selection targets and do not display a deviation amount.

On the other hand, FIG. 9B illustrates an example of extended feature lines generated by using the adjustment regions in which projection lines are expanded in the width direction. In this case, extended feature lines are generated at the positions indicated by the five arrows, and the number of display targets of the deviation amount is increased.

Figure 10A:
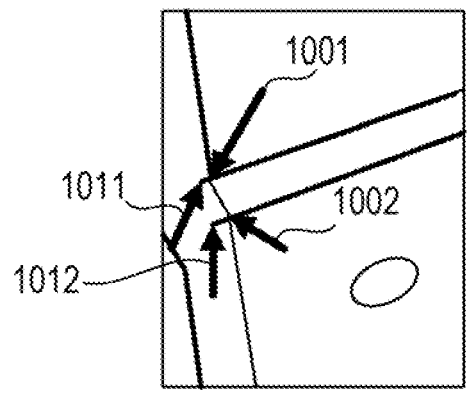
FIG. 10A is a diagram illustrating an example of an extended feature line generated by using an adjustment region having the same length as the projection line in a partial region of the image of the object Illustrated in FIG. 1A.
Figure 10B:
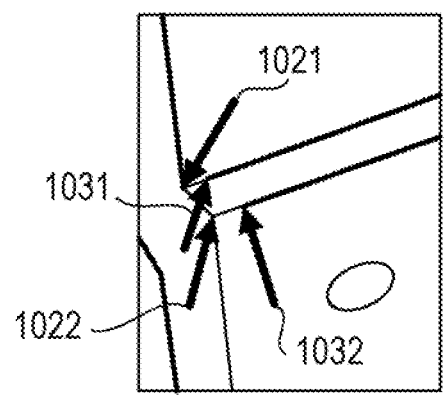
FIG. 10B is a diagram illustrating an example of an extended feature line generated by using an adjustment region obtained by shortening the projection line in a length direction.

FIGS. 10A and 10B illustrate an example of the effect obtained when the projection line is shortened in the length direction. FIG. 10A illustrates an example of an extended feature line generated by using an adjustment region having the same length as the projection line in a partial region of the image of the object illustrated in FIG. 1A. In this case, there is a high possibility that the feature line is extended to a region where the boundary line of the object is not present, with only slight deviation of the overlap result.

Since a feature line is not detected from the region where the boundary line of the object is not present, the feature line detected from such a region represents a shadow, a flaw, or the like, rather than the boundary line of the object. Therefore, a feature line having an end point that is deviated in the length direction thereof with respect to the end point of the projection line is likely to be a false feature line. If the end point of the generated extended feature line exceeds the end point of the boundary line of the object, when a specific extended feature line is selected, the same effect as that of a false feature line is provided, and thus there is a high possibility that a false extended feature line is selected.

Arrows 1001 and 1002 in FIG. 10A indicate an end point of the boundary line of the object, and arrows 1011 and 1012 indicate an end point of the generated extended feature line. The end points of these extended feature lines are beyond the end points of the boundary line of the object.

On the other hand, FIG. 10B illustrates an example of extended feature lines generated by using the adjustment regions in which projection lines are shortened in the length direction. Arrows 1021 and 1022 indicate an end point of the boundary line of the object, and arrows 1031 and 1032 indicate an end point of the generated extended feature lines. The end points of these extended feature lines do not exceed the end points of the boundary line of the object. Therefore, the extended feature line corresponding to the optimal feature line is highly likely to be selected as a specific extended feature line.

FIG. 11 illustrates an example of the target feature line selection processing performed by the selection unit 418. The selection unit 418 performs edge detection processing on the image 432 to obtain the gradient intensity of each pixel, and generates a gradient image 1101. In this case, a pixel having a large pixel value over the gradient image 1101 is more likely to correspond to the edge line.

Then, in the region 801 before selection, the selection unit 418 calculates an overlap score representing an evaluation value of each extended feature line based on the pixel values (gradient intensities) of the pixels through which each of the plurality of extended feature lines passes over the gradient image 1101 for each group of the extended feature lines. For example, a statistical value of pixel values of pixels through which an extended feature line passes may be used as an overlap score.

The statistical value of the pixel value may be a sum, an average value, a median value, a most frequent value, or the like. The statistical value of the pixel value may be the number of occurrences in which a pixel value equal to or greater than a predetermined value appears. When such an overlap score is used, it may be interpreted that the greater the overlap score, the greater the degree to which the extended feature line overlaps with the edge line.

Therefore, the selection unit 418 selects the extended feature line having the maximum overlap score for each group of the extended feature lines. In the region 801 after the selection, an extended feature line indicated by an arrow 1111 and an extended feature line indicated by an arrow 1112 are selected. Then, the selection unit 418 selects a feature line before extension corresponding to the selected extended feature line as a target feature line.

FIG. 12 illustrates an example of a set of feature lines 439 of the group to which an identifier 0 is assigned. The set of feature lines 439 in FIG. 12 includes an Index, an identifier, an end point 1 and an end point 2 of a feature line (before extension), an end point 1 and an end point 2 of the feature line (after extension), an end point 1 and an end point 2 of a projection line, an overlap score, and a selection result.

The index is the identification information of the feature line. An identifier 0 represents group identification information and is identical to the identification information of the projection line. The end point 1 of the feature line (before extension) represents the 2D coordinates of the start point of the feature line, and the end point 2 of the feature line (before extension) represents the 2D coordinates of the end point of the same feature line. The end point 1 of the feature line (after extension) represents the 2D coordinates of the start point of the extended feature line, and the end point 2 of the feature line (after extension) represents the 2D coordinates of the end point of the same extended feature line. The end point 1 of the projection line represents the 2D coordinates of one end point of the projection line, and the end point 2 of the projection line represents the 2D coordinates of the other end point of the same projection line. The unit of the 2D coordinates is the number of pixels.

The overlap score represents an evaluation value of the extended feature line, and the selection result represents a feature line and an extended feature line selected based on the evaluation value. In FIG. 12, since the overlap score has not yet been calculated, the overlap score of all extended feature lines is set to an initial value −1, and the selection result is not recorded. By such a set of feature lines 439, a feature line to which the same identifier is assigned and a projection line are associated with each other.

Figure 13:
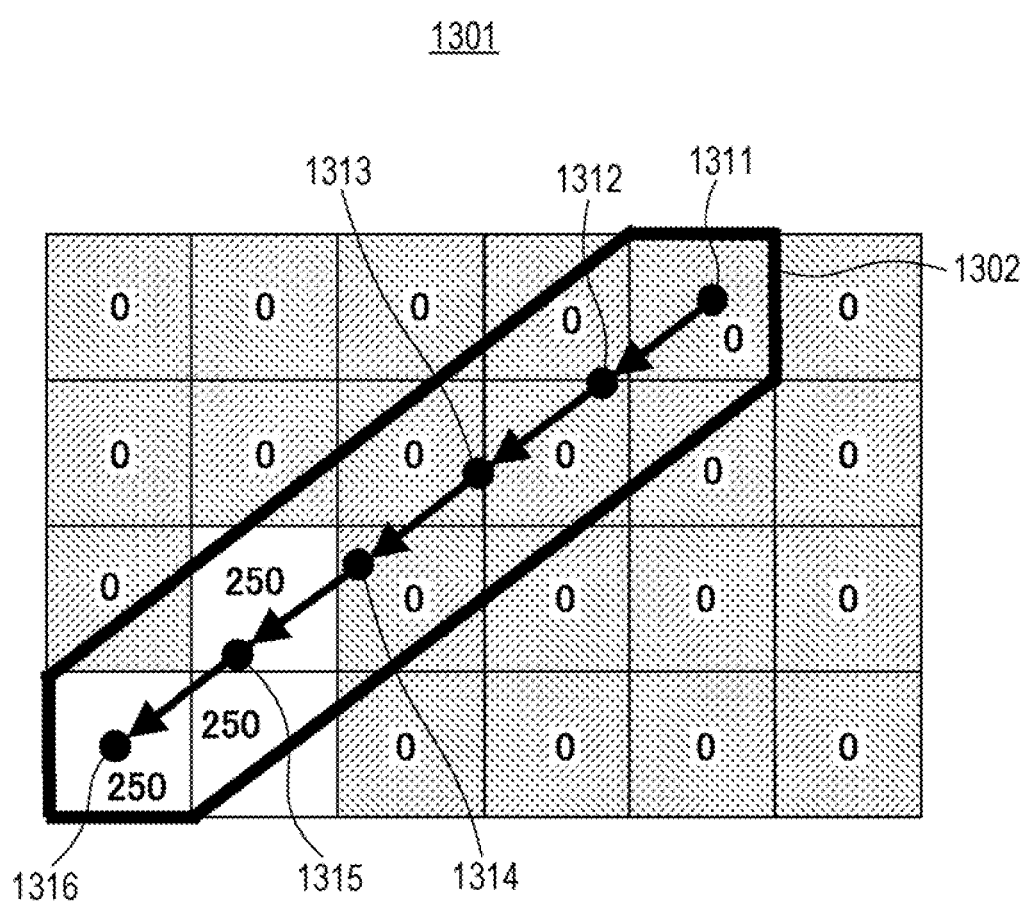
FIG. 13 is a diagram illustrating overlap score calculation processing.

FIG. 13 illustrates an example of overlap score calculation processing. Each rectangle of the gradient image 1301 represents a pixel, and a numerical value in the rectangle represents a pixel value. In this example, the pixel values of each pixel are 0 or 250. A pixel having a pixel value of 250 is more likely to correspond to an edge line than a pixel having a pixel value of 0.

The selection unit 418 multiplies the unit vector (arrow) having the same inclination as an extended feature line 1302 from a start point 1311 toward an end point 1316 of the extended feature line 1302 by an integer number, thereby extending the unit vector from the start point 1311. Then, the selection unit 418 acquires pixel values of pixels including positions of the start point 1311, points 1312 to 1315, and the end point 1316 to obtain the sum of the acquired pixel values as an overlap score. In this case, 6 pixel values of 0, 0, 0, 0, 250, and 250 are acquired, and the overlap score is 500.

For example, the selection unit 418 calculates an overlap score S(m) of an m-th extended feature line to which the identifier n is assigned as the group identification information by using the following equation.

$$Qe'(m,t)=Qe(m)+tEse(m)(t=0,1,2,\ldots),$$

$$\{Qe'(m,t) || Qe'(m,t)-Qs(m)| \leq |Qe(m)-Qs(m)|, Qe'(m,t) \in Xn\} \quad (4)$$

$$S(m)=\Sigma V(Qe'(m,t)) \quad (5)$$

The definitions of Qs(m), Qe(m), Qe'(m, t), Ese(m), t and Xn in Equation (4) are as follows.

Qs(m): a vector representing the 2D coordinates of the start point of the m-th extended feature line Qe(m): a vector representing the 2D coordinates of the end point of the m-th extended feature line Qe'(m, t): a vector representing the 2D coordinates of the point over the m-th extended feature line Ese(m): a unit vector in the direction from the start point of the m-th feature line toward the end point.

t: a parameter representing the amount of change in the 2D coordinates

Xn: a set of vectors representing the 2D coordinates of pixels included in an adjustment region having the identifier n V(Qe'(m, t)) of Equation (5) represents pixel values of pixels including a point indicated by Qe'(m, t) over a gradient image, and Σ represents a sum relating to parameter t.

The selection unit 418 may calculate an overlap score by using another calculation equation instead of Equation (5). For example, a value obtained by multiplying a statistical value of pixel values of pixels through which the extended feature line passes by a predetermined coefficient may be used as an overlap score. The predetermined coefficient may be the length of the extended feature line, or may be a coefficient in consideration of an average value and variance from a distribution of statistical values for a plurality of extended feature lines having the same identifier.

FIG. 14 illustrates an example of the calculation result of the overlap score for the set of feature lines 439 in FIG. 12. "○" of the selection result indicates the selected feature line and extended feature line, and "x" indicates the feature line and extended feature line which are not selected. In this example, since the overlap score of the extended feature line corresponding to the feature line of Index "222" among the feature lines to which the identifier 0 is assigned is the maximum, these feature lines and extended feature lines are selected.

Even if the optimal feature line is short, the overlap score of the extended feature line obtained by extending the feature line becomes a large value by extending the feature line included in the set of feature lines 439 within the adjustment region. On the other hand, even if the feature line representing the noise is extended, the overlap score of the extended feature line does not increase much. Therefore, it is possible to correctly evaluate each feature line included in the set of feature lines 439 and to select an optimal feature line by using the overlap score of the extended feature line.

Figure 15A:
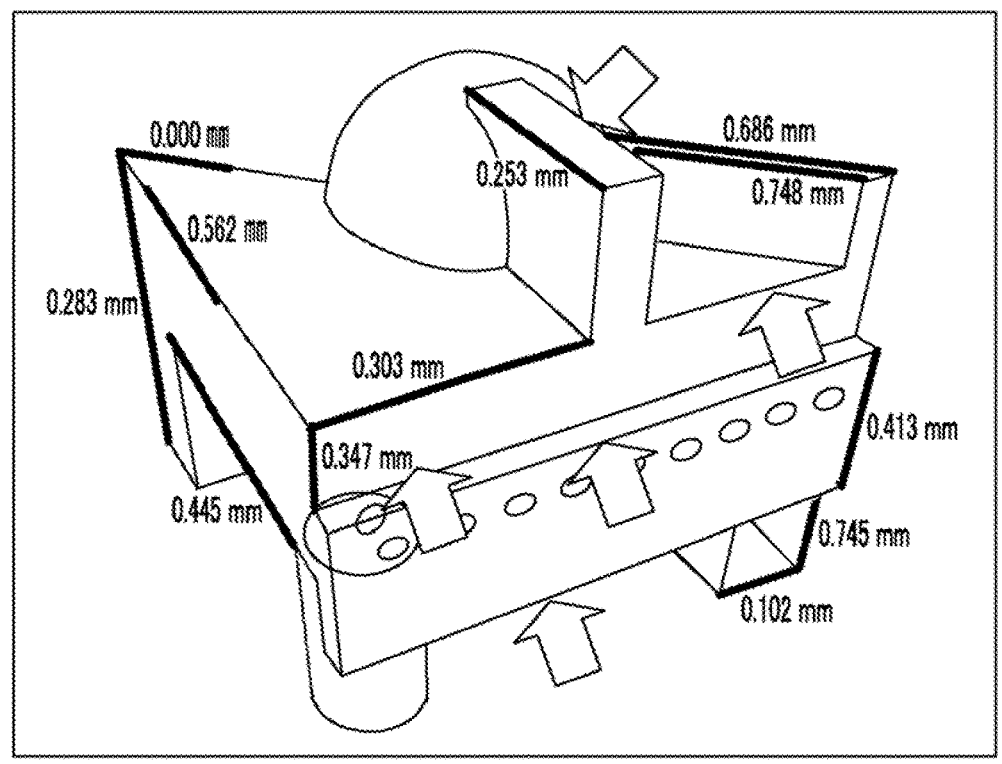
FIG. 15A is a diagram illustrating an example of a deviation amount displayed by using a set of corresponding pairs before a corresponding pair is added by a selection unit.
Figure 15B:
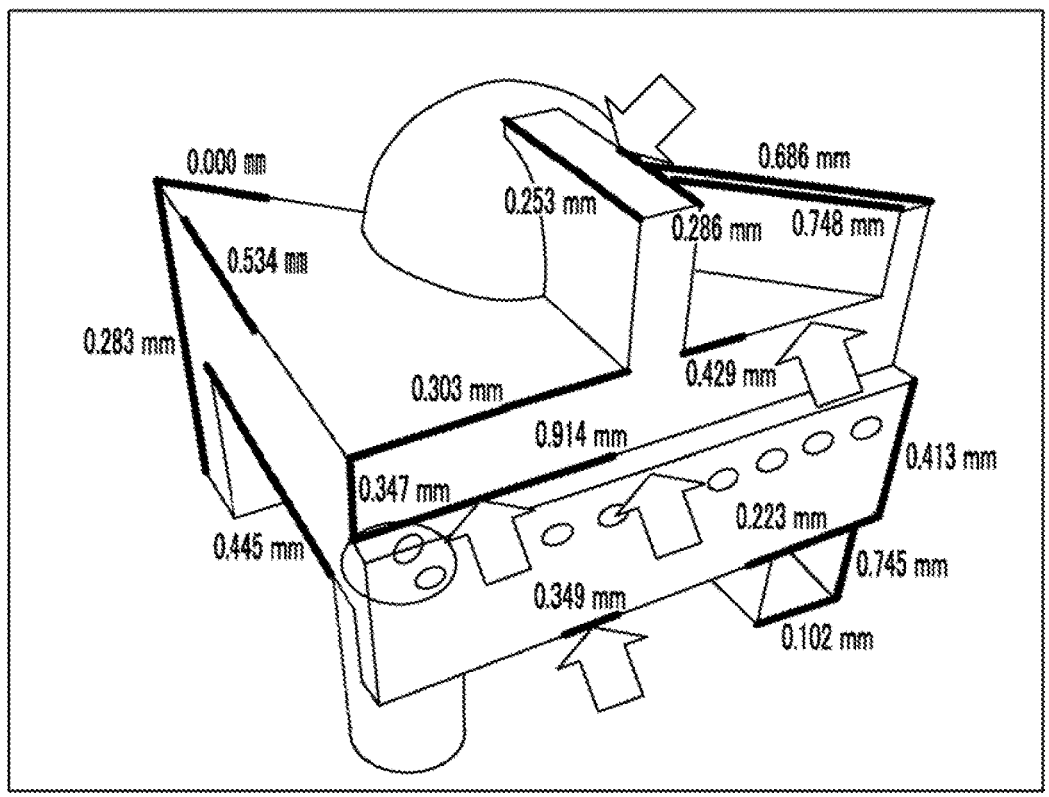
FIG. 15B is a diagram illustrating an example of the deviation amount displayed by using the set of corresponding pairs after a corresponding pair is added by the selection unit.

FIGS. 15A and 15B Illustrate an example of the deviation amounts displayed over the screen. FIG. 15A illustrates an example of the deviation amount displayed by using the set of corresponding pairs 436 before the corresponding pair is added by the selection unit 418. In this example, each corresponding pair included in the set of corresponding pairs 436 is displayed over the image of the object illustrated in FIG. 1A in a superimposed manner.

The numerical values displayed near the projection line and the feature line represent a deviation amount obtained by converting the error between the positions of the projection line and the feature line into a distance in a 3D space having a unit of millimeters (mm). The 5 arrows indicate projection lines in which the deviation amount is not displayed.

On the other hand, FIG. 15B illustrates an example of the deviation amount displayed by using the set of corresponding pairs 436 after the corresponding pair is added by the selection unit 418. In FIG. 15B, the deviation amounts of the projection lines indicated by the 5 arrows are displayed, and the number of display targets of the deviation amount is increased.

The calculation unit 420 may calculate the deviation amount Err[mm] in the 3D space by the following equation.

$$Err=(LA/LB)*h \quad (6)$$

LA of Equation (6) represents a length (mm) in a 3D space of a 3D line segment included in a corresponding pair, and LB represents a length (number of pixels) of a projection line of the 3D line segment. h represents an average value of the lengths (number of pixels) of perpendiculars drawn from both ends of the feature lines included in the corresponding pair to the projection line over the image 432.

Figure 16:
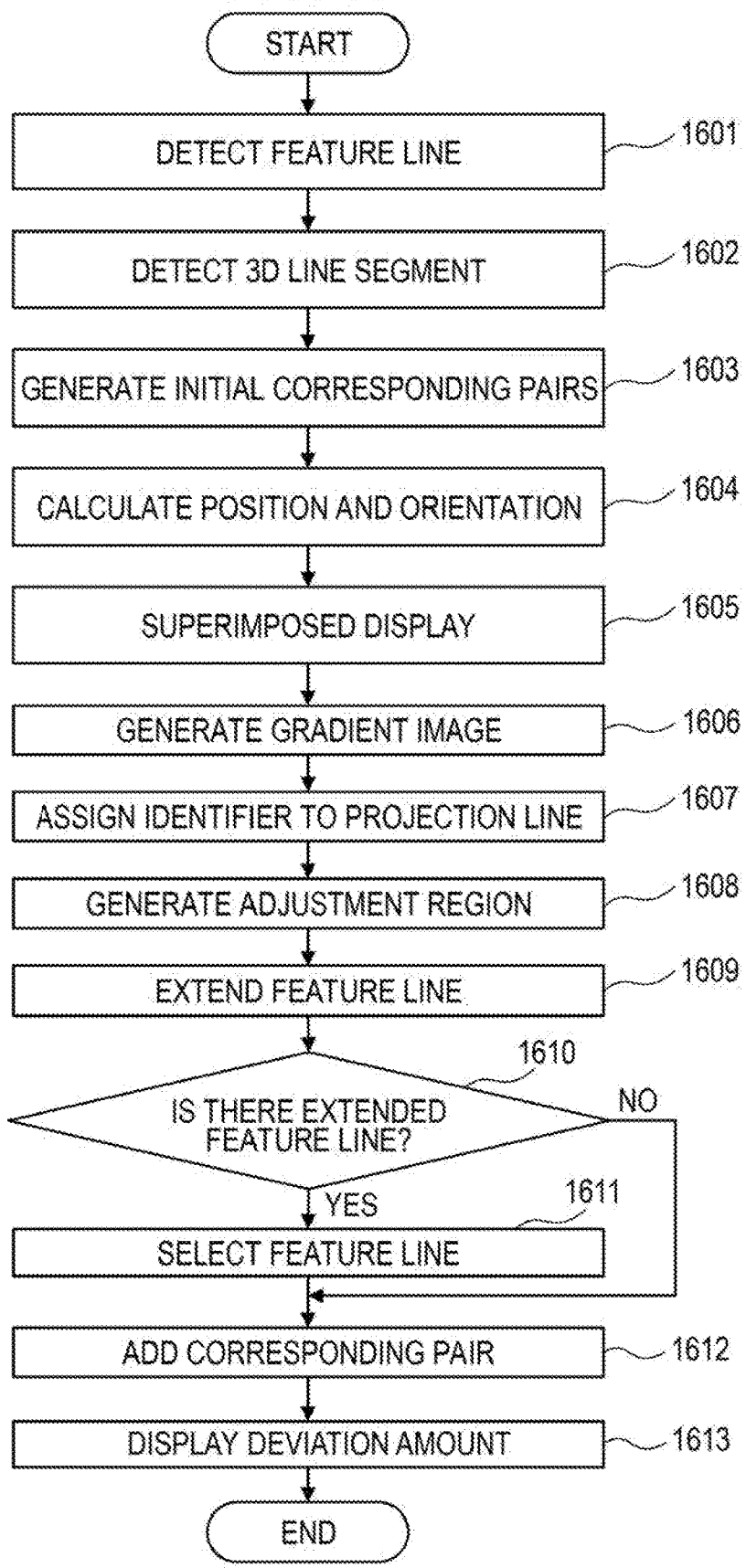
FIG. 16 is a flowchart illustrating a specific example of image processing.

FIG. 16 is a flowchart illustrating a specific example of image processing performed by the image processing apparatus 401 in FIG. 4. First, the feature line detection unit 413 detects a plurality of feature lines 433 from the image 432 (step 1601), and the line segment detection unit 414 detects a plurality of 3D line segments 434 from the CAD data 431 (step 1602).

Next, the generation unit 417 generates k initial corresponding pairs from the feature line 433 and the 3D line segment 434 (step 1603), and the parameter calculation unit 419 calculates the position and orientation of the imaging apparatus 402 using the k initial corresponding pairs (step 1604).

The projection unit 415 projects the 3D line segment 434 over the image 432 by using the position and orientation of the imaging apparatus 402 to generate a projection line, and the display unit 421 displays the projection line and the feature line 433 over the image 432 in a superimposed manner (step 1605). Then, the generation unit 417 adds k initial corresponding pairs to the set of corresponding pairs 436.

Next, the selection unit 418 generates a gradient image from the image 432 (step 1606), and assigns an identifier to each projection line (step 1607). Next, the selection unit 418 generates adjustment regions having the same identifier as each projection line and extracts a feature line 433 overlapping with each of the adjustment regions to generate the set of feature lines 439 (step 1608). The selection unit 418 performs feature line extension processing on each feature line included in the set of feature lines 439 (step 1609).

Next, the selection unit 418 checks whether or not an extended feature line exists for each of the adjustment regions (step 1610). When there is an extended feature line (YES in step 1610), the selection unit 418 selects any of the feature lines included in the set of feature lines 439 based on the overlap score of the generated extended feature line (step 1611). The selection unit 418 adds the corresponding pair including the 3D line segment 434 represented by the projection line and the selected feature line to the set of corresponding pairs 436 (step 1612).

On the other hand, when there is no extended feature line (NO in step 1610), the generation unit 417 adds the corresponding pair including the 3D line segment 434 represented by the projection line and the feature line satisfying a predetermined condition to the set of corresponding pairs 436 (step 1612).

Next, the projection unit 415 projects the 3D line segment of the corresponding pair included in the set of corresponding pairs 436 over the image 432 again to generate a projection line, and the calculation unit 420 calculates the deviation amount between the 3D line segment and the feature line by using the generated projection line. The display unit 421 displays the projection line and the feature line of the corresponding pair over the image 432 in a superimposed manner, and displays the deviation amount for each combination of the projection line and the feature line (step 1613).

FIGS. 17A and 17B illustrate an example of an increment of a corresponding pair when the corresponding pair is added to the set of corresponding pairs 436 by the feature line extension processing. FIG. 17A Illustrates an experimental result for the object A1, and FIG. 17B illustrates an experimental result for the object A2. In this experiment, the position and orientation of the imaging apparatus 402 are calculated by using 4 corresponding pairs.

The image number is identification information for identifying a plurality of images in which each object is captured. In FIG. 17A, 5 images of image numbers "3" to "7" are used, and in FIG. 17B, 6 images of image numbers "1" to "6" are used.

The pattern is identification information for identifying a set of 4 corresponding pairs used for calculating the position and orientation of the imaging apparatus 402. When the combination of the 4 corresponding pairs changes, the generated projection lines are also changed, and thus different experimental results are obtained for each pattern. In FIGS. 17A and 17B, a set of three patterns "1" to "3" is used.

The numerical value in the cell corresponding to a row indicated by each pattern and a column indicated by each image number is the ratio of the number of feature lines selected by the feature line extension processing to the number of projection lines included in the set of corresponding pairs 436 (%). This ratio corresponds to the increment of the corresponding pair by the feature line extension processing.

ave represents the average value of the increments obtained for patterns "1" to "3". In FIG. 17A, the average value of ave for 5 images is about 6%, and in FIG. 17B, the average value of ave for 6 images is about 11%. Depending on the increment of the corresponding pair, the number of display targets of the deviation amount is also increased.

In step 1606 of FIG. 16, the selection unit 418 may generate a gradient image by performing edge detection processing on the image 432 by using an edge detection filter having a filter coefficient according to the position and the inclination of each projection line. For example, the selection unit 418 rotates the edge detection filter in accordance with the inclination of the projection line and redistributes the filter coefficient to generate an edge detection filter suitable for the projection line.

Figure 18A:
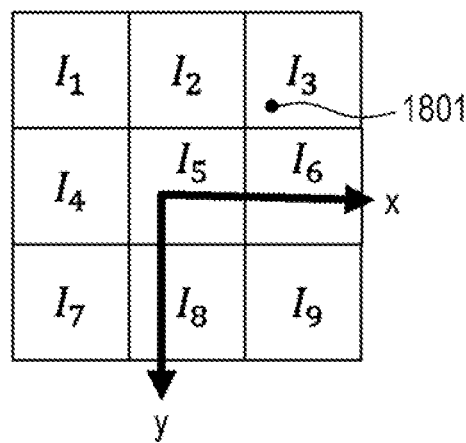
FIG. 18A is a diagram illustrating an example of a 3×3 edge detection filter.
Figure 18B:
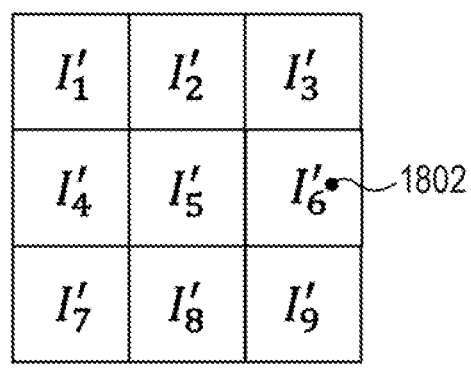
FIG. 18B is a diagram illustrating an example of the edge detection filter after rotation, obtained by rotating the edge detection filter of FIG. 18A.

FIGS. 18A and 18B illustrate an example of an edge detection filter. FIG. 18A illustrates an example of a 3×3 edge detection filter. The edge detection filter in FIG. 18A includes filter coefficients $I_1$ to $I_9$.

FIG. 18B illustrates an example of the edge detection filter after rotation which is obtained by rotating the edge detection filter in FIG. 18A. The edge detection filter after rotation includes filter coefficients $I_1'$ to $I_9'$.

When the projection line is inclined by an angle θ, the selection unit 418 rotates the edge detection filter by the angle θ. For example, it is possible to obtain a filter coefficient of the edge detection filter after rotation by regarding the edge detection filter as a 3×3 small image and correlating the pixel at the position after rotation and the pixel at the position before rotation by bilinear interpolation. In this case, the position over the edge detection filter before the rotation is represented by the coordinates (x, y).

First, according to the following equation, the selection unit 418 calculates the coordinates $(x_j, y_j)$ in the edge detection filter before rotation from the coordinates $(x_j', y_j')$ of a j-th filter coefficient (j=1 to 9) in the edge detection filter after rotation.

$$\begin{pmatrix} x_j \\ y_j \end{pmatrix} = \begin{pmatrix} \cos\theta & \sin\theta \\ -\sin\theta & \cos\theta \end{pmatrix} \begin{pmatrix} x_j' \\ y_j' \end{pmatrix} \quad (11)$$

The point 1801 in FIG. 18A moves to a point 1802 in FIG. 18B by rotation. In this case, the coordinates of a filter coefficient $I_6'$ after the rotation are $(x_6', y_6')$, and the coordinates before the rotation of the filter coefficient $I_6'$ are $(x_6, y_6)$.

Figure 19A:
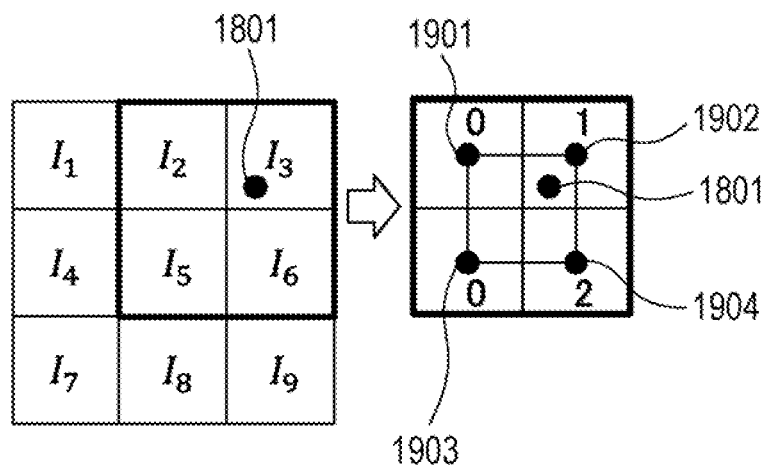
FIG. 19A is a diagram illustrating an example of the nearest four points to a point before rotation.
Figure 19B:
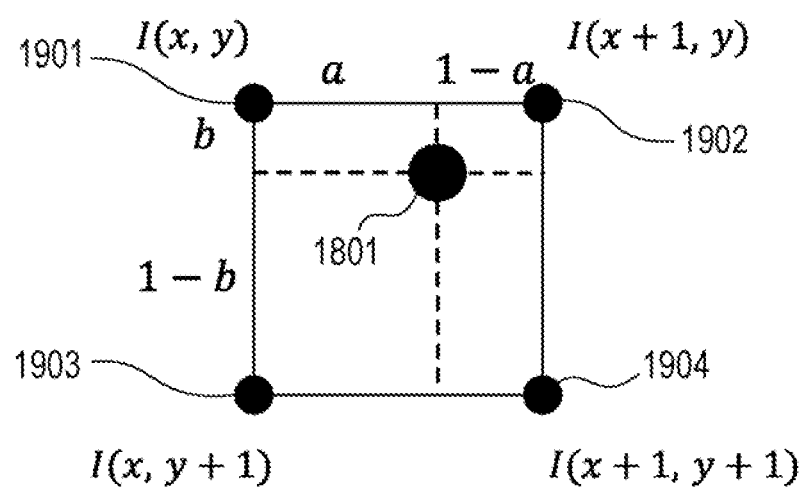
FIG. 19B is a diagram illustrating an example of a method for calculating a filter coefficient after rotation by bilinear interpolation.

FIGS. 19A and 19B illustrate an example of a method for calculating the filter coefficient in the edge detection fitter after the rotation illustrated in FIG. 18B. FIG. 19A illustrates an example of the nearest 4 points to the point 1801 before the rotation. In this example, points 1901 to 1904 corresponds to the nearest 4 points with respect to the point 1801.

FIG. 19B Illustrates an example of a method for calculating the filter coefficient after the rotation by bilinear interpolation. The coordinates of the point 1901 are (x, y), the coordinates of the point 1902 are (x+1, y), the coordinates of point 1903 are (x, y+1), and the coordinates of the point 1904 are (x+1, y+1).

A parameter a represents the ratio of the distance between the point 1901 and the point 1902 to the distance between the point 1901 and the point 1801 in an x direction. A parameter b represents the ratio of the distance between the point 1901 and the point 1903 to the distance between the point 1901 and the point 1801 in a y direction.

I(x, y) is the filter coefficient of the point 1901, I(x+1, y) is the filter coefficient of the point 1902, I(x, y+1) is the filter coefficient of the point 1903, and I(x+1, y+1) is the filter coefficient of the point 1904.

The selection unit 418 calculates the filter coefficient I'(x', y') in the coordinates (x', y') after rotation by bilinear interpolation of the following equation using the filter coefficient, the parameter a, and the parameter b of the points 1901 to 1904.

$$I(x',y')=(1-a)(1-b)I(x,y)+a(1-b)I(x+1,y)+(1-a)bI(x,y+1)+abI(x+1,y+1) \quad (12)$$

FIG. 20 illustrates an example of the edge detection filter after the redistribution. The selection unit 418 obtains the filter coefficients $I_1'$ to $I_9'$ in FIG. 18B by Equation (12), and then calculates the sum S of the absolute values of the filter coefficients $I_1'$ to $I_9'$ according to the following equation.

$$S=\Sigma|I_j'| \quad (13)$$

$\Sigma$ in Equation (13) represents the sum for j=1 to 9. Next, the selection unit 418 normalizes a filter coefficients $I_j'$ by dividing each filter coefficient $I_j'$ by a sum S. The selection unit 418 performs edge detection processing by applying the normalized edge detection filter to the adjustment region having the same identifier as that of the projection line and the peripheral region thereof. For example, a region in which the adjustment region is expanded by up to 10 pixels may be used as the peripheral region of the adjustment region.

Figures 21A, 21B, 21C:
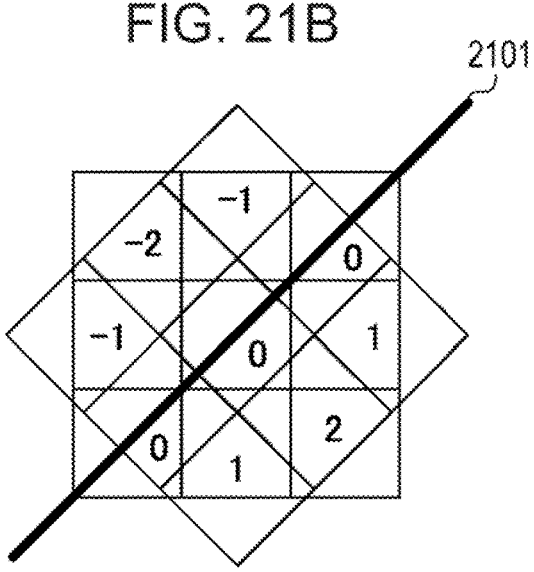
FIG. 21A is a diagram illustrating an example of a Sobel filter corresponding to the edge detection filter before rotation.
FIG. 21B is a diagram illustrating an example of the Sobel filter rotated by 45° in accordance with a projection line inclined by 45°.
FIG. 21C is a diagram illustrating an example of the edge detection filter after redistribution.

FIGS. 21A to 21C illustrates a specific example of the filter coefficient. FIG. 21A illustrates an example of a Sobel filter corresponding to an edge detection filter before rotation. FIG. 21B illustrates an example of a Sobel filter rotated by 45° In accordance with the projection line 2101 inclined by 450, and FIG. 21C illustrates an example of an edge detection filter after redistribution.

By performing edge detection processing using such an edge detection filter, it is possible to detect the original edge line, which is expected to have an inclination similar to that of the projection line, with high sensitivity while suppressing the disturbance (noise) of the pixel value in the image 432. Thus, it is possible to obtain an overlap score that is faithful to the boundary line of the object included in the image 432. Therefore, the processing is effective when importance is placed on edge detection accuracy.

The selection unit 418 may generate a plurality of edge images by performing edge detection processing on the image 432 by using a plurality of parameters, and may generate a gradient image by using the edge images. In this case, a size of the image to be processed (length and width in the vertical and horizontal directions), a threshold value for the gradient intensity, and the like are used as parameters for the edge detection processing.

By using a plurality of ratios as the ratio of the size of the image to be processed to the size of the image 432, a plurality of processing target images are generated, and the edge detection processing for the processing target images is performed to generate a plurality of edge images. The ratio of the size of the image to be processed may be a ratio in the range of 50% to 100%. It is also possible to generate a plurality of edge images based on the threshold values by using a plurality of threshold values for the gradient intensities.

The selection unit 418 generates a gradient image by averaging the plurality of edge images according to the following equation, for example.

$$V(i,j) = \frac{1}{G}\sum V_g(i,j) \quad (14)$$

V(i, j) of Equation (14) represents a pixel value at the 2D coordinates (I, j) of the gradient image, $V_g$(i, j) represents a pixel value at the 2D coordinates (I, j) of the edge image of a g-th edge image (g=1 to G), and $\Sigma$ represents a sum for g=1 to G. When the sizes of the G edge images are different, the selection unit 418 interpolates the pixel values by using bicubic interpolation, bilinear interpolation, or the like.

If the edge detection processing for the image 432 is performed one time based on a single size or a single threshold value, a large amount of noise in the image 432 may be detected or only a small amount of edge lines may be detected. In contrast, by repeating the edge detection processing a plurality of times while changing the parameters, it is possible to generate an edge image in consideration of the gradient intensity for various images, and it is possible to detect a larger number of edge lines while suppressing noise.

Figure 22A:
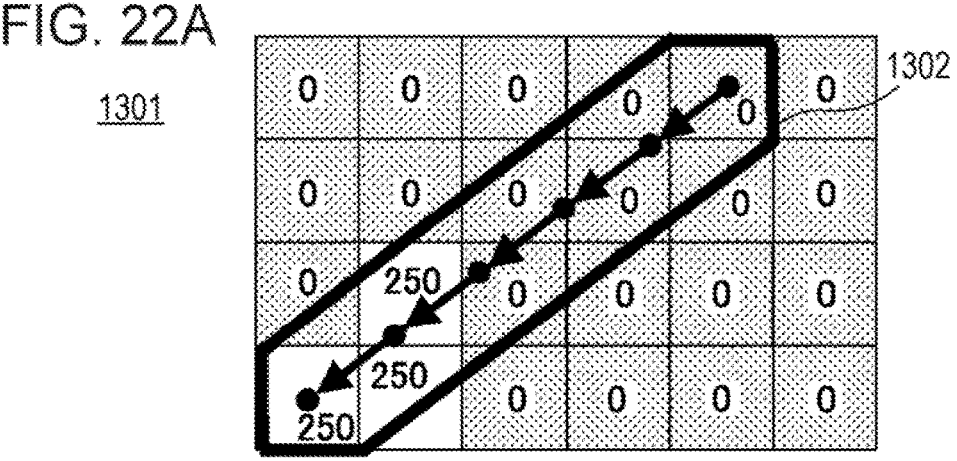
FIG. 22A is a diagram illustrating overlap score calculation processing using a gradient image of FIG. 13.
Figure 22B:
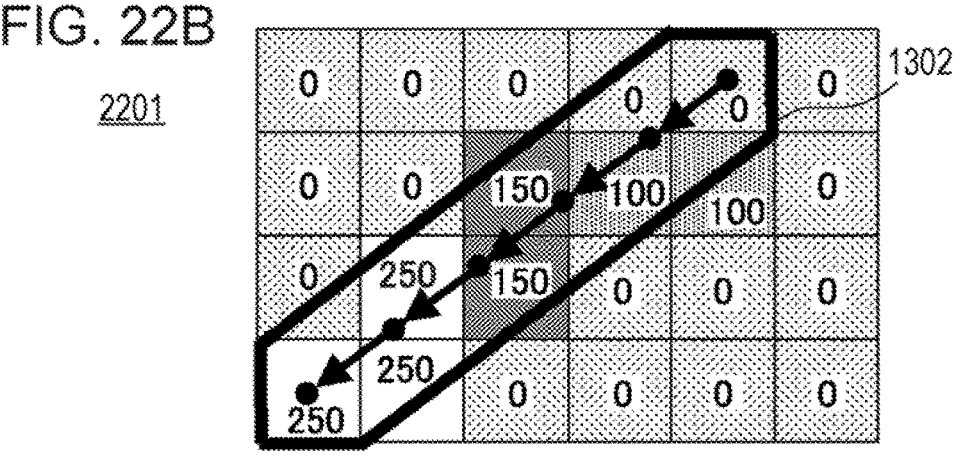
FIG. 22B is a diagram illustrating an example of overlap score calculation processing using a plurality of times of edge detection processing.
Figure 22C:
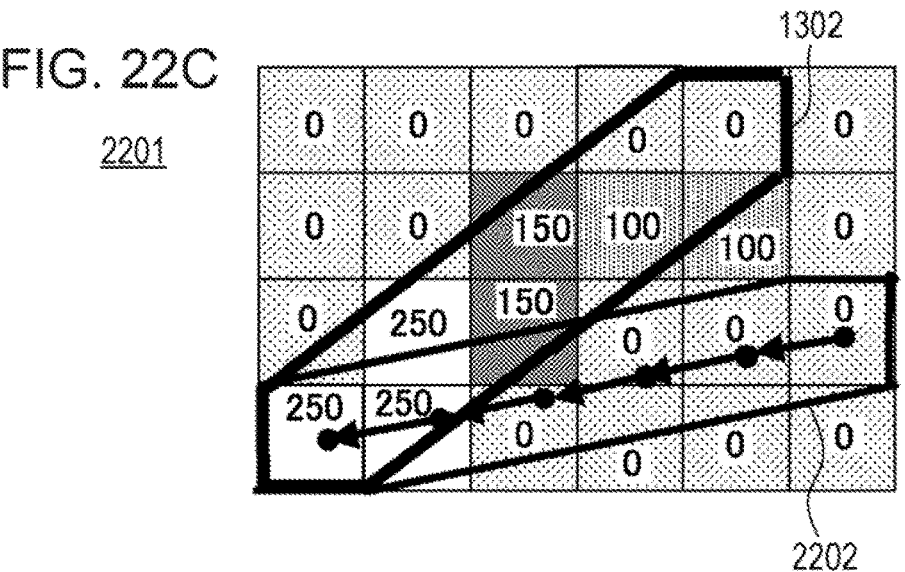
FIG. 22C is a diagram Illustrating an example of overlap score calculation processing for two extended feature lines using a gradient image.

FIGS. 22A to 22C illustrate an example of the overlap score calculation processing using a plurality of times of edge detection processing. FIG. 22A illustrates the overlap score calculation processing using the gradient image 1301 illustrated in FIG. 13. As described above, the gradient image 1301 is generated by one time of edge detection processing, and the overlap score of the extended feature line 1302 is 500.

FIG. 22B illustrates an example of the overlap score calculation processing using a plurality of times of edge detection processing. The gradient image 2201 is generated by a plurality of times of edge detection processing, and the pixel values of each pixel are 0, 100, 150, or 250. In this way, edge lines which were not detected are detected in one time of edge detection processing, and the pixel value reflects that the edge line is a weak edge line. In this case, 6 pixel values 0, 100, 150, 150, 250 and 250 are acquired by extending the unit vector indicated by the arrow, and the overlap score of the extended feature line 1302 is 900.

FIG. 22C illustrates an example of the overlap score calculation processing for the two extended feature lines using the gradient image 2201. When the extended feature line 1302 overlapping with an extended feature line 2202 exists, 6 pixel values of 0, 0, 0, 0, 250 and 250 are obtained by extending a unit vector (arrow) having the same inclination as the extended feature line 2202. Therefore, the overlap score of the extended feature line 2202 is 500.

In this case, the extended feature line 1302 having a greater overlap score than the extended feature line 2202 is selected as a specific extended feature line. In this manner, it is possible to more accurately select extended feature lines by using the gradient image 2201 including the pixel indicating the weak edge line in place of the gradient image 1301.

In step 1611 of FIG. 16, the selection unit 418 may set a threshold value for the overlap score based on the set of feature lines 439 generated from each of the plurality of projection lines, and may select a specific extended feature line from each of the adjustment regions by using the threshold value.

In this case, the selection unit 418 calculates the overlap score of the extended feature line generated from each of a plurality of sets of feature lines 439, and sets a threshold value by using the overlap score of the extended feature line. The selection unit 418 extracts a plurality of candidate feature lines from the plurality of extended feature lines generated from the respective set of feature lines 439 by using the threshold value, and selects a specific extended feature line from among the candidate feature lines.

For example, the selection unit 418 calculates the statistical value of the overlap score of all the extended feature lines in all the adjustment regions and excludes an extended feature line having an overlap score that is more than a constant multiple of the standard deviation from the statistical value in each adjustment region. The selection unit 418 extracts the remaining extended feature lines, that is, the extended feature lines having an overlap score in a range less than a constant multiple of the standard deviation as candidate feature lines. The statistical value of the overlap score may be an average value, a median value, or the like. As a constant multiple of the standard deviation, 2 times or 3 times may be used.

When the extended feature lines are narrowed down, the number of display targets of the deviation amount may decrease, but the extended feature lines may be evaluated based on a stricter criterion by comparing the overlap scores of the extended feature lines based on all the feature lines detected from the entire image 432. Therefore, the processing is effective when it is desired to select extended feature lines with higher accuracy.

In step 1611 of FIG. 16, the selection unit 418 may calculate an overlap score based on the direction (gradient direction) of the gradient of the pixel value over the image 432.

In this case, the selection unit 418 obtains the gradient direction for each pixel of the image 432, obtains a normal direction perpendicular to the gradient direction of each pixel, and obtains a similarity between the direction of the projection line and the normal direction of each pixel. The selection unit 418 selects pixels to be used for the calculation of the overlap score from the gradient image based on the calculated similarity and calculates the overlap score of each extended feature line by using the pixel values of the selected pixels.

For example, the selection unit 418 calculates a unit vector Eori representing a normal direction perpendicular to the gradient direction of each pixel of the image 432 according to the following equation.

$$\theta(V(x, y)) = \tan^{-1}\left(\frac{\partial V(x, y)}{\partial y} \bigg/ \frac{\partial V(x, y)}{\partial x}\right) \quad (15)$$

$$Eori = (\sin(\theta(V(x, y))), -\cos(\theta(V(x, y)))) \quad (16)$$

V(x, y) in Equation (15) represents a pixel value of a pixel at the coordinates (x, y) over the image 432, θ(V(x, y)) represents an angle of the pixel in the gradient direction, and Eori represents a direction of an edge line in the pixel.

Next, the selection unit 418 calculates a similarity α between the direction vector indicating the length direction of the projection line and the unit vector Eori. For example, the absolute value of the cosine similarity between the direction vector of the projection line and the Eori may be used as the similarity α. Then, the selection unit 418 selects pixels having the similarity α larger than a predetermined value as pixels to be used for calculation of the overlap score.

FIGS. 23A to 23C illustrate an example of the overlap score calculation processing using the gradient direction of the pixel values. FIG. 23A Illustrates an example of a gradient image. In this example, the pixel values of each pixel are 0 or 250. However, since the pixel values of pixels 2311 to 2314 represents noise independent of the boundary line of the object, it is desirable to exclude the pixel values from the processing target when calculating the overlap score.

FIG. 23B Illustrates an example of the overlap score calculation processing that does not use the gradient direction of each pixel. By extending the unit vector (arrow) having the same inclination as the extended feature line 2302, 6 pixel values of 0, 250, 250, 250, 250 and 250 are acquired. Therefore, the overlap score of the extended feature line 2302 is 1250.

By extending a unit vector (arrow) having the same inclination as the other extended feature line 2303, 6 pixel values of 250, 250, 250, 250, 250 and 250 are acquired. Therefore, the overlap score of the extended feature line 2303 is 1500.

In this case, although the extended feature line 2303 does not represent the boundary line of the object, because the extended feature line 2303 has a larger overlap score than the extended feature line 2302, the extended feature line 2303 is selected.

FIG. 23C illustrates an example of the unit vector Eori Indicating the normal direction of each pixel. The normal direction of pixels 2321 to 2326 is approximate to the length direction of the projection line, and the similarity α of these pixels becomes larger than the predetermined value. On the other hand, the normal direction of the pixels 2311 to 2314 is not approximate to the length direction of the projection line, and the similarity α of these pixels is smaller than the predetermined value.

Therefore, in the overlap score calculation processing using the gradient direction of each pixel, the pixels 2311 to 2314 are excluded from the processing target, and the overlap score of the extended feature line 2303 becomes 500. In this case, since the overlap score of the extended feature line 2302 is larger than the overlap score of the extended feature line 2303, the extended feature line 2302 is selected.

In this manner, it is possible to remove the influence of noise from the gradient image and to calculate an accurate overlap score by using the gradient direction of each pixel. As a result, the extended feature line may be evaluated based on a stricter criterion, which is effective processing when it is desired to select an extended feature line with higher accuracy.

The configurations of the image processing apparatus of FIGS. 2 and 4 are merely examples, and some components may be omitted or changed according to the use or conditions of the image processing apparatus. For example, in the image processing apparatus 401 of FIG. 4, the image acquisition unit 412 may be omitted when the image 432 is stored in advance in the storage unit 411. When an external device displays the set of corresponding pairs 436, the display unit 421 may be omitted. Other shape information representing the shape of the object may be used instead of the CAD data 431.

The flowcharts in FIGS. 3 and 16 are merely examples, and a part of the processing may be omitted or changed according to the configuration or conditions of the image processing apparatus. For example, when an external apparatus displays the set of corresponding pairs 436, the processing of step 1613 in FIG. 16 may be omitted.

The image and feature line in FIGS. 1A and 18, the projection line and feature line in FIG. 5, the 3D line segment and projection line in FIG. 6, and the projection line and feature line in FIG. 12 are merely examples, and the image of the object, the 3D line segment, the projection line, and the feature line change depending on the configuration or conditions of the object to be imaged and the image processing apparatus.

The adjustment region in FIGS. 7A and 7B, the extended feature lines in FIGS. 8 to 10B, and the gradient images in FIGS. 11, 13, 22A to 22C, and 23A to 23C are merely examples, and the adjustment region, the extended feature line, and the gradient image change according to the object to be imaged and the configuration or conditions of the image processing apparatus. The overlap score in FIG. 14 is merely an example, and the overlap score changes depending on the extended feature line and the gradient image.

The corresponding pair and deviation amount in FIGS. 15A and 158 and the increment of the corresponding pair in FIGS. 17A and 17B are merely examples, and the corresponding pair, the deviation amount, and the increment of the corresponding pair change depending on the object to be imaged and the configuration or conditions of the image processing apparatus.

The edge detection filter illustrated in FIGS. 18A to 21C is merely an example, and another edge detection filter may be used in accordance with the configuration or conditions of the image processing apparatus.

The calculation formulas of Equations (1) to (16) are merely examples, and another calculation formula may be used according to the configuration or conditions of the image processing apparatus.

Figure 24:
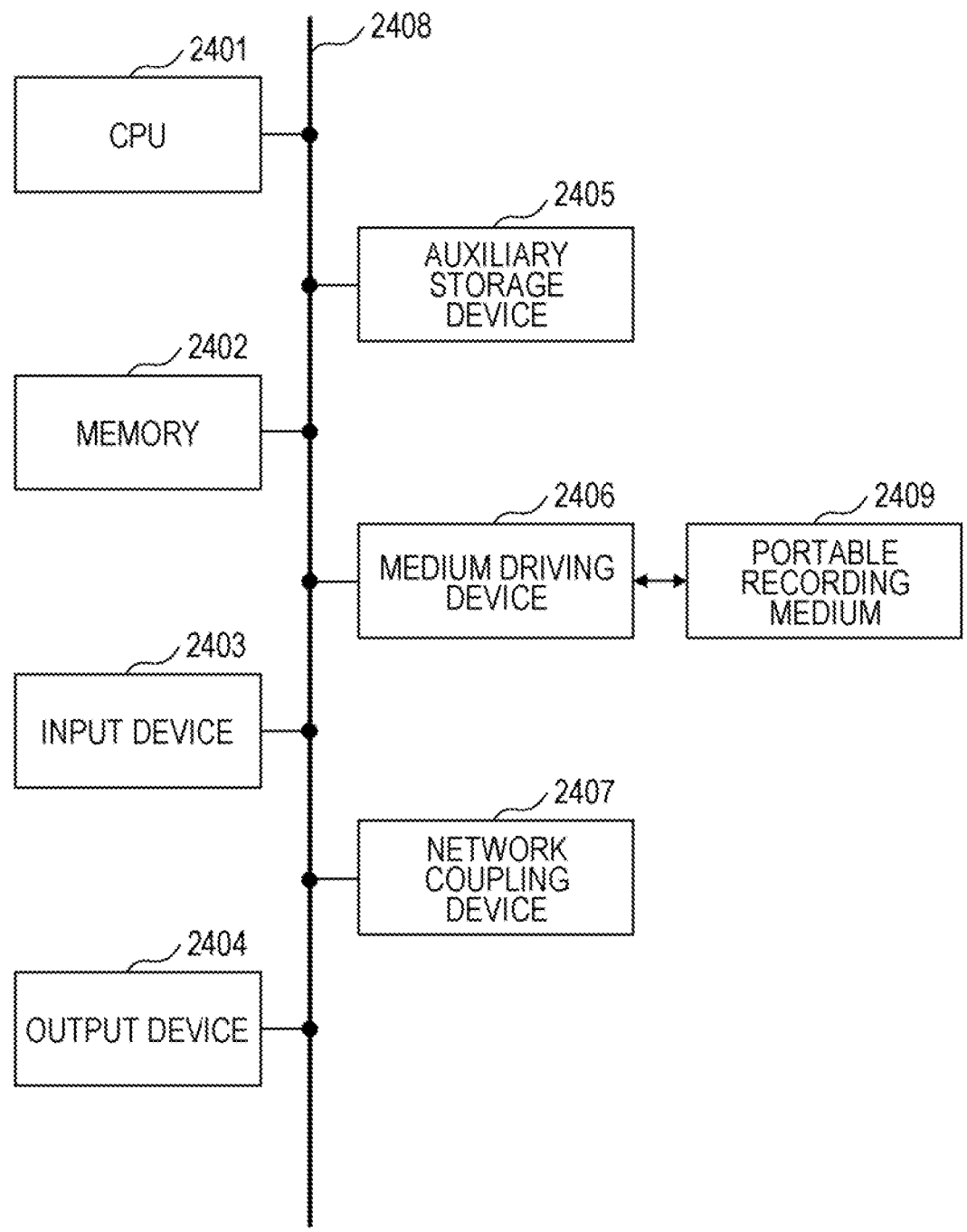
FIG. 24 is a configuration diagram of an information processing apparatus.

FIG. 24 illustrates a configuration example of an information processing apparatus (computer) used as the image processing apparatus in FIGS. 2 and 4. The information processing apparatus in FIG. 24 includes a central processing unit (CPU) 2401, a memory 2402, an input device 2403, an output device 2404, an auxiliary storage device 2405, a medium driving device 2406, and a network coupling device 2407. These components are coupled to each other by a bus 2408. The imaging apparatus 402 in FIG. 4 may be coupled to the bus 2408.

The memory 2402 is a semiconductor memory such as a read-only memory (ROM), a random-access memory (RAM), a flash memory, and stores programs and data used for processing. The memory 2402 may be used as the storage unit 211 of FIG. 2 or the storage unit 411 of FIG. 4.

The CPU 2401 (processor), for example, operates as the detection unit 212, the projection unit 213, the selection unit 214, and the calculation unit 215 in FIG. 2 by executing a program loaded in the memory 2402.

The CPU 2401 also operates as the image acquisition unit 412, the feature line detection unit 413, the line segment detection unit 414, the projection unit 415, and the parameter setting unit 416 in FIG. 4 by executing the program loaded in the memory 2402. The CPU 2401 also operates as the generation unit 417, the selection unit 418, the parameter calculation unit 419, and the calculation unit 420 by executing the program loaded in the memory 2402.

The input device 2403 is a keyboard, a pointing device, or the like, and is used for inputting instructions or information from an operator or a user, for example. The output device 2404 is a display device, a printer, a speaker or the like, for example, and is used for outputting inquiries or instructions and a processing result to the operator or the user. The processing result may be the deviation amount from the projection line and feature line representing the corresponding pair. The output device 2404 may be used as the display unit 421 in FIG. 4.

The auxiliary storage device 2405 is a magnetic disk device, an optical disk device, a magneto-optical disk device, a tape device, or the like, for example. The auxiliary storage device 2405 may be a hard disk drive or a flash memory. The information processing apparatus may cause the auxiliary storage device 2405 to store programs and data and load the programs and data into the memory 2402 for use. The auxiliary storage device 2405 may be used as the storage unit 211 in FIG. 2 or the storage unit 411 in FIG. 4.

The medium driving device 2406 drives the portable recording medium 2409 and accesses the recorded contents. The portable recording medium 2409 is a memory device, a flexible disk, an optical disk, a magneto-optical disk, or the like. The portable recording medium 2409 may be a compact disk read-only memory (CD-ROM), a digital versatile disk (DVD), a Universal Serial Bus (USB) memory, or the like. An operator or a user may cause the portable recording medium 2409 to store programs and data and load the programs and data into the memory 2402 for use.

As described above, the computer readable recording medium storing the program and data used for the image processing is a physical (non-transitory) storage medium such as the memory 2402, the auxiliary storage device 2405, or the portable recording medium 2409.

The network coupling device 2407 is a communication interface circuit which is coupled to a communication network such as local area network (LAN), wide area network (WAN), and performs data conversion for communication. The information processing apparatus may receive programs and data from an external device through the network coupling device 2407 and load the programs and data into the memory 2402 for use.

The information processing apparatus may not include all the components in FIG. 24, and it is also possible to omit some components according to the use or condition. For example, the medium driving device 2406 or the network coupling device 2407 may be omitted when the portable recording medium 2409 or a communication network is not used.

While the disclosed embodiment and their advantages have been described in detail, those skilled in the art may make various modifications, additions, and omissions without departing from the scope of the embodiment explicitly set forth in the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus comprising:
a memory that stores shape information including a plurality of line segments representing a shape of an object; and
a processor, coupled to the memory, configured to:
detect a plurality of feature lines from an image of the object,
generate a target projection line by projecting any of the plurality of line segments over the image of the object,
extract a feature line overlapping with a predetermined region based on the target projection line over the image of the object from the plurality of feature lines to generate a set of feature lines, and select a target feature line from the set of feature lines based on gradient Information Indicating a gradient of pixel values over the image of the object, and
calculate a deviation amount between a line segment corresponding to the target projection line and the target feature line.

2. The image processing apparatus according to claim 1, wherein the processor is configured to generate the predetermined region by expanding the target projection line in a width direction.

3. The image processing apparatus according to claim 2, wherein the processor is configured to generate the predetermined region by shortening the target projection line in a length direction.

4. The image processing apparatus according to claim 1, wherein the processor is configured to extract a feature line partially or entirely included in the predetermined region among the plurality of feature lines, as the feature line overlapping with the predetermined region.

5. The image processing apparatus according to claim 1, wherein the processor is configured to:
generate a gradient image including a magnitude of the gradient of a pixel values over the image of the object as a pixel value of each pixel,
generate an extended feature line by extending a feature line included in the set of feature lines in a length direction,
calculate an evaluation value of each of the plurality of extended feature lines based on pixel values of pixels through which each of the plurality of extended feature lines generated from the set of feature lines passes over the gradient image,
select a specific extended feature line based on the evaluation value of each of the plurality of extended feature lines, and
select a feature line corresponding to the specific extended feature line as the target feature line.

6. The image processing apparatus according to claim 5, wherein the processor is configured to generate the gradient image by performing edge detection processing on the image of the object by using a filter having a filter coefficient according to a position and an inclination of the target projection line.

7. The image processing apparatus according to claim 5, wherein the processor is configured to generate a plurality of edge images by performing edge detection processing on the image of the object by using a plurality of parameters, and generate the gradient image by using the plurality of edge images.

8. The image processing apparatus according to claim 5, wherein the processor is configured to:
generate a plurality of target projection lines by projecting each of the plurality of line segments over the image of the object,
generate a plurality of sets of feature lines by extracting a feature line overlapping with a predetermined region based on each of the plurality of target projection lines over the image of the object from the plurality of feature lines,
generate an extended feature line from each of the plurality of sets,
calculate an evaluation value of the extended feature line generated from the plurality of sets,
set a threshold value for the evaluation value by using the evaluation value of the extended feature line generated from the plurality of sets,
extract a plurality of candidate feature lines from the plurality of extended feature lines by using the threshold value, and
select the specific extended feature line from the plurality of candidate feature lines.

9. The image processing apparatus according to claim 5, wherein the processor is configured to:
obtain a direction of the gradient of pixel values over the image of the object for each pixel of the image of the object,
obtain a normal direction perpendicular to the gradient direction of each pixel,
obtain a similarity between a direction of the target projection line and the normal direction of each pixel,
select a pixel to be used to calculate the evaluation value from the gradient image based on the similarity, and
calculate the evaluation value of each of the plurality of extended feature lines by using the pixel value of the selected pixel.

10. The image processing apparatus according to claim 1, further comprising:
a display that displays the image of the object, the line segment corresponding to the target projection line, the target feature line, and the deviation amount over the screen.

11. A computer-implemented image processing method comprising:
detecting a plurality of feature lines from an image of the object,
generating a target projection line by projecting any of the plurality of line segments over the image of the object,
extracting a feature line overlapping with a predetermined region based on the target projection line over the image of the object from the plurality of feature lines to generate a set of feature lines, and selecting a target feature line from the set of feature lines based on gradient information Indicating a gradient of pixel values over the Image of the object, and
calculating a deviation amount between a line segment corresponding to the target projection line and the target feature line.

12. The computer-implemented image processing method of claim 11,
wherein the computer generates the predetermined region by expanding the target projection line in a width direction.

13. The computer-implemented image processing method of claim 12,
wherein the computer generates the predetermined region by shortening the target projection line in a length direction.

14. The computer-implemented image processing method of claim 11,
wherein the computer extracts a feature line partially or entirely included in the predetermined region among the plurality of feature lines, as the feature line overlapping with the predetermined region.

15. The computer-implemented image processing method of claim 11,
wherein the computer
generates a gradient image including a magnitude of the gradient of a pixel values over the image of the object as a pixel value of each pixel,
generates an extended feature line by extending a feature line included in the set of feature lines in a length direction,
calculates an evaluation value of each of the plurality of extended feature lines based on pixel values of pixels through which each of the plurality of extended feature lines generated from the set of feature lines passes over the gradient image,
selects a specific extended feature line based on the evaluation value of each of the plurality of extended feature lines, and
selects a feature line corresponding to the specific extended feature line as the target feature line.

16. A non-transitory computer-readable recording medium having stored therein a computer program which, when executed by a processor, cause the processor to:
detect a plurality of feature lines from an image of an object,
generate a target projection line by projecting any of a plurality of line segments over the image of the object,
extract a feature line overlapping with a predetermined region based on the target projection line over the image of the object from the plurality of feature lines to generate a set of feature lines, and select a target feature line from the set of feature lines based on gradient information indicating a gradient of pixel values over the image of the object, and
calculate a deviation amount between a line segment corresponding to the target projection line and the target feature line.

17. The non-transitory computer-readable recording medium of claim 16,
wherein the processor is configured to generate the predetermined region by expanding the target projection line in a width direction.

18. The non-transitory computer-readable recording medium of claim 17,
wherein the computer program causes the processor to generate the predetermined region by shortening the target projection line in a length direction.

19. The non-transitory computer-readable recording medium of claim 16,
wherein the computer program causes the processor to extract a feature line partially or entirely included in the predetermined region among the plurality of feature lines, as the feature line overlapping with the predetermined region.

20. The non-transitory computer-readable recording medium of claim 16,
wherein the computer program causes the processor to:
generate a gradient image including a magnitude of the gradient of a pixel values over the image of the object as a pixel value of each pixel,
generate an extended feature line by extending a feature line included in the set of feature lines in a length direction,
calculate an evaluation value of each of the plurality of extended feature lines based on pixel values of pixels through which each of the plurality of extended feature lines generated from the set of feature lines passes over the gradient image,
select a specific extended feature line based on the evaluation value of each of the plurality of extended feature lines, and
select a feature line corresponding to the specific extended feature line as the target feature line.

* * * * *